US008285783B2

(12) United States Patent
Otobe

(10) Patent No.: US 8,285,783 B2
(45) Date of Patent: Oct. 9, 2012

(54) DISTRIBUTION SYSTEM AND DISTRIBUTION METHOD

(75) Inventor: Takashi Otobe, Kanagawa (JP)

(73) Assignee: Sony Corporation (JP)

( * ) Notice: Subject to any disclaimer, the term of this patent is extended or adjusted under 35 U.S.C. 154(b) by 2017 days.

(21) Appl. No.: 10/380,715

(22) PCT Filed: Sep. 20, 2001

(86) PCT No.: PCT/JP01/08205
§ 371 (c)(1),
(2), (4) Date: Jun. 25, 2003

(87) PCT Pub. No.: WO02/25459
PCT Pub. Date: Mar. 28, 2002

(65) Prior Publication Data
US 2004/0010599 A1    Jan. 15, 2004

(30) Foreign Application Priority Data

Sep. 20, 2000  (JP) ................................. 2000-285339

(51) Int. Cl.
*G06F 15/16* (2006.01)
(52) U.S. Cl. ........................................................ 709/204
(58) Field of Classification Search .................. 709/204, 709/216, 223, 228
See application file for complete search history.

(56) References Cited

U.S. PATENT DOCUMENTS

| | | | |
|---|---|---|---|
| 5,805,719 A * | 9/1998 | Pare et al. ...................... 382/115 |
| 5,872,915 A * | 2/1999 | Dykes et al. ...................... 726/5 |
| 5,913,040 A * | 6/1999 | Rakavy et al. ................. 709/232 |
| 5,933,811 A * | 8/1999 | Angles et al. ............... 705/14.56 |
| 5,948,061 A * | 9/1999 | Merriman et al. ............. 709/219 |
| 5,987,232 A * | 11/1999 | Tabuki .............................. 726/5 |
| 6,000,033 A * | 12/1999 | Kelley et al. ...................... 726/8 |
| 6,278,499 B1 * | 8/2001 | Darbee et al. .................. 348/734 |
| 6,282,713 B1 * | 8/2001 | Kitsukawa et al. .............. 725/36 |
| 6,393,434 B1 * | 5/2002 | Huang et al. ........................... 1/1 |
| 6,397,259 B1 * | 5/2002 | Lincke et al. ................. 709/236 |
| 6,421,733 B1 * | 7/2002 | Tso et al. ....................... 709/246 |
| 6,438,576 B1 * | 8/2002 | Huang et al. .................. 709/202 |
| 6,446,130 B1 * | 9/2002 | Grapes .......................... 709/231 |

(Continued)

FOREIGN PATENT DOCUMENTS
JP           04351128 A       12/1992
(Continued)

OTHER PUBLICATIONS

Office Action from Japanese Application No. 2002-529393, dated Aug. 9, 2011.

*Primary Examiner* — Jerry Dennison
(74) *Attorney, Agent, or Firm* — Lerner, David, Littenberg, Krumholz & Mentlik, LLP

(57) ABSTRACT

A portable terminal apparatus including an individual identification acquiring device and a unit for transmitting individual identification information. A central controller allows for comparing a piece of individual identification data, stored in a storage unit to the received individual identification information and, if an individual identification code could be specified, the portable terminal apparatus obtains information from the base apparatus. The distributive information storage unit stores information to be distributed. Information relative to a material displayed on a large-sized image display apparatus is transmitted from the base apparatus to the portable terminal apparatus through a communication line.

48 Claims, 24 Drawing Sheets

U.S. PATENT DOCUMENTS

| | | | |
|---|---|---|---|
| 6,530,081 B1* | 3/2003 | Hayes, Jr. | 717/176 |
| 6,549,625 B1* | 4/2003 | Rautila et al. | 380/258 |
| 6,601,129 B1* | 7/2003 | Arakeri et al. | 710/316 |
| 6,611,881 B1* | 8/2003 | Gottfurcht et al. | 710/18 |
| 6,721,787 B1* | 4/2004 | Hiscock | 709/217 |
| 6,845,448 B1* | 1/2005 | Chaganti et al. | 713/166 |
| 6,857,102 B1* | 2/2005 | Bickmore et al. | 715/205 |
| 6,874,037 B1* | 3/2005 | Abram et al. | 709/248 |
| 6,944,773 B1* | 9/2005 | Abrahams | 713/168 |
| 6,950,646 B2* | 9/2005 | Pradhan et al. | 455/406 |
| 6,986,038 B1* | 1/2006 | Leah et al. | 713/155 |
| 6,986,039 B1* | 1/2006 | Leah et al. | 713/155 |
| 7,080,037 B2* | 7/2006 | Burger et al. | 705/50 |
| 7,093,017 B1* | 8/2006 | Olgaard et al. | 709/227 |
| 7,155,488 B1* | 12/2006 | Lunsford et al. | 709/216 |
| 7,185,360 B1* | 2/2007 | Anton et al. | 726/3 |
| 7,191,451 B2* | 3/2007 | Nakagawa | 719/317 |
| 7,328,004 B1* | 2/2008 | Wolters et al. | 455/414.1 |
| 7,412,462 B2* | 8/2008 | Margolus et al. | 1/1 |
| 7,424,543 B2* | 9/2008 | Rice, III | 709/229 |
| 7,761,326 B2* | 7/2010 | Miyaoku et al. | 705/14.39 |
| 2001/0042124 A1* | 11/2001 | Barron | 709/227 |
| 2002/0059588 A1* | 5/2002 | Huber et al. | 725/35 |
| 2002/0151327 A1* | 10/2002 | Levitt | 455/556 |
| 2002/0194586 A1* | 12/2002 | Gutta et al. | 725/10 |
| 2003/0220835 A1* | 11/2003 | Barnes, Jr. | 705/14 |
| 2004/0010599 A1* | 1/2004 | Otobe | 709/228 |
| 2007/0192483 A1* | 8/2007 | Rezvani et al. | 709/224 |
| 2008/0060075 A1* | 3/2008 | Cox et al. | 726/24 |

FOREIGN PATENT DOCUMENTS

| | | |
|---|---|---|
| JP | 08328458 A | 12/1996 |
| JP | 09244567 A | 9/1997 |
| JP | 11085861 A | 3/1999 |
| JP | 11096252 A | 4/1999 |
| JP | 11134265 A | 5/1999 |
| JP | 2000029932 A | 1/2000 |
| JP | 2000047980 A | 2/2000 |
| JP | 2000115845 A | 4/2000 |
| JP | 2000132515 A | 5/2000 |
| JP | 2000181956 A | 6/2000 |
| JP | 2000259529 A | 9/2000 |

* cited by examiner

FIG. 2
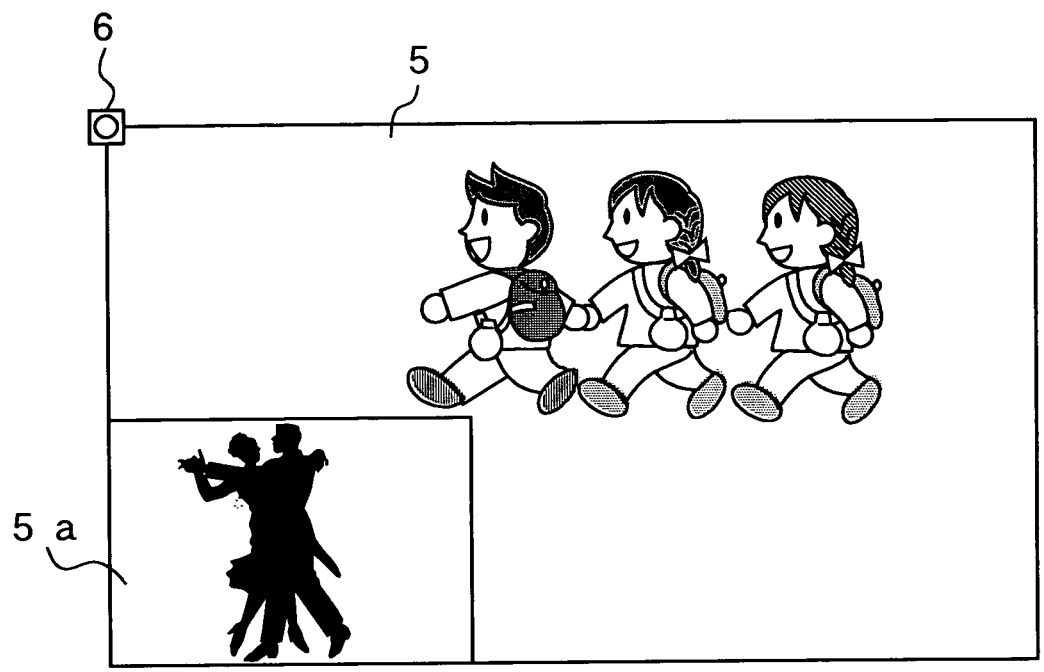

F I G. 3
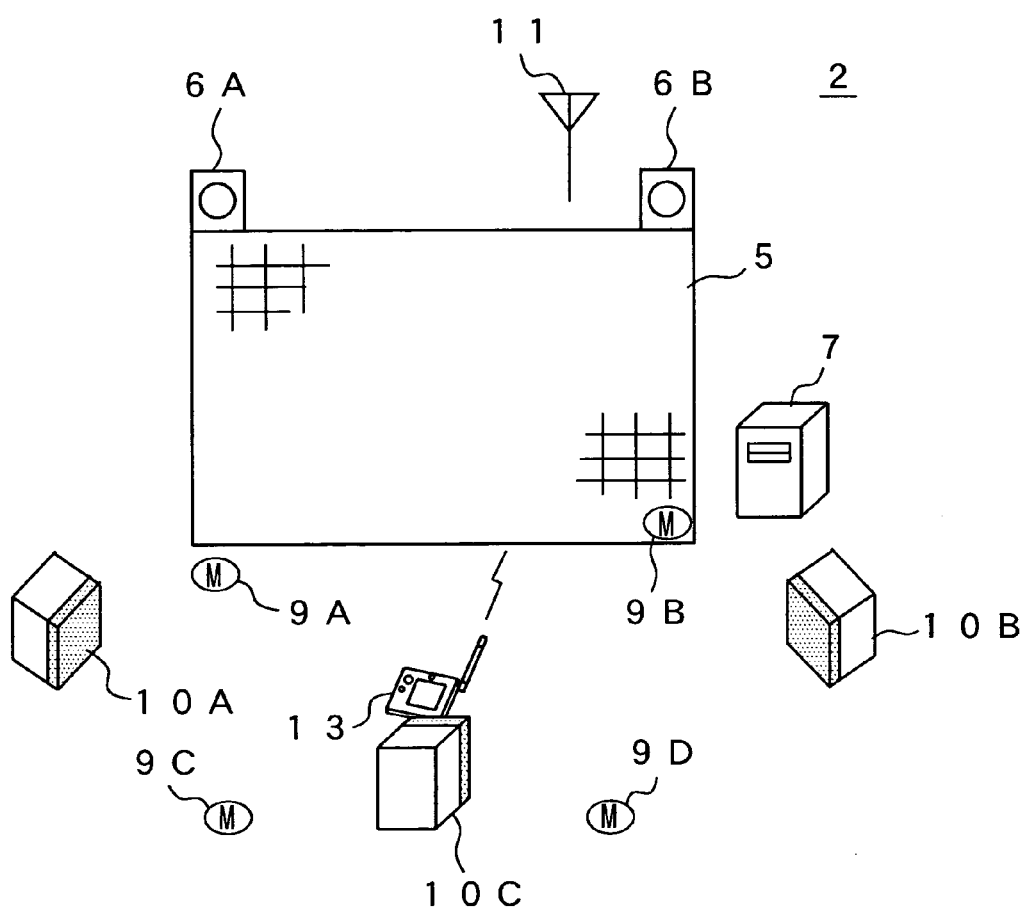

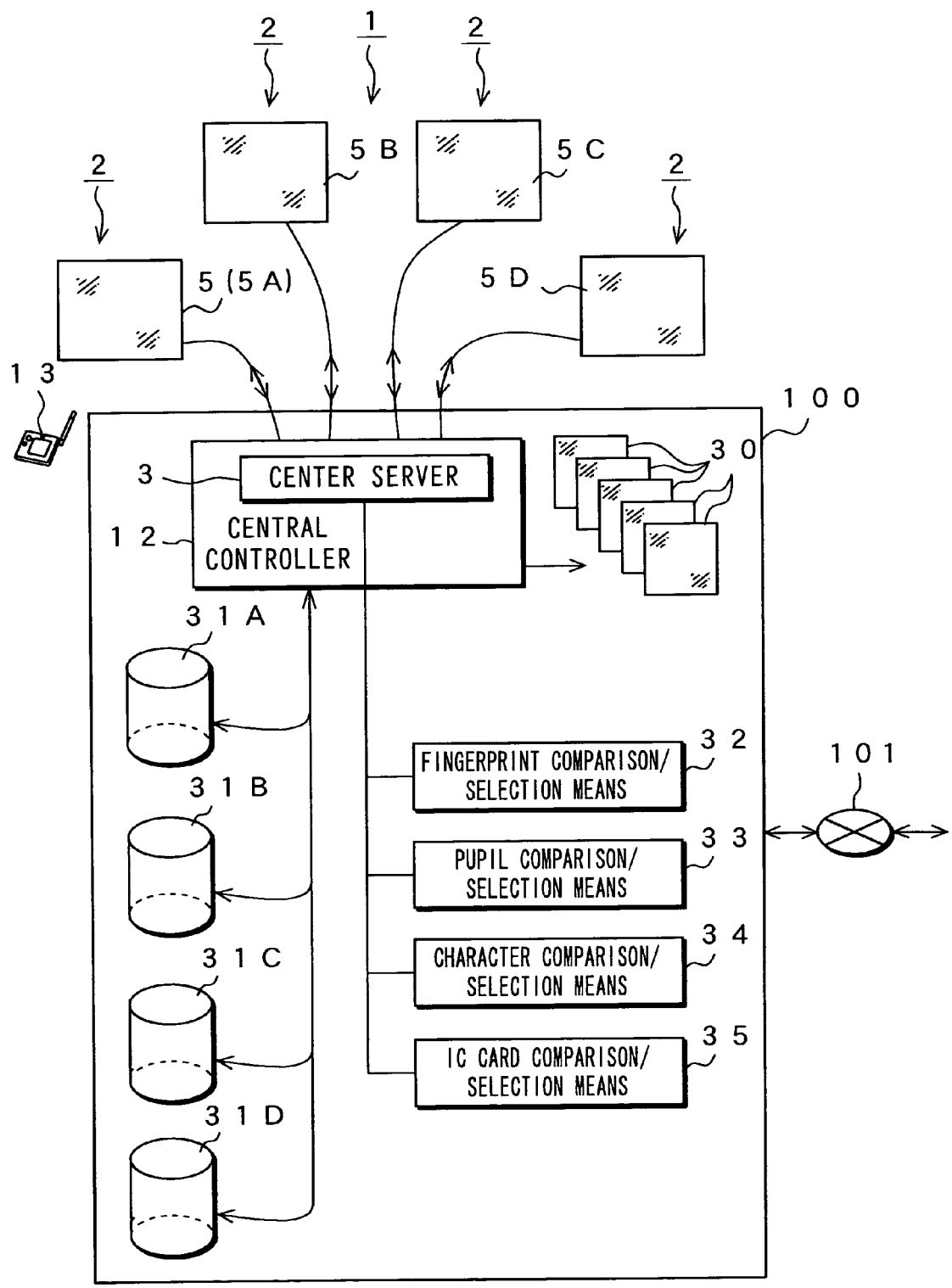

F I G. 1 6

1. NAME (HANDLE NAME ALLOWABLE)
2. AGE STRUCTORE (BOY, YOUTH, MIDDLE AGE, PERSON OF RIPE AGE, DATE OF BIRTH)
3. HOMETOWN INFORMATION
4. SEX
5. PRESENT ADDRESS
6. FIRM, SCHOOL (OCCUPATION)
7. FAMILY MAKE-UP, INFORMATION
8. CARRIER INFORMATION (GRADUATED COLLEGE ETC)
9. HOBBY
10. TASTE INFORMATION
    10a. FAVORITE COOKING, DISLIKE COOKING
    10b. FAVORITE ANIMAL, DISLIKE ANIMAL
    10c. FAVORITE LANDSCAPE, DISLIKE LANDSCAPE
    10d. FAVORITE COLOR, DISLIKE COLOR
    10e. FAVORITE NATION, DISLIKE NATION
    10f. FAVORITE CAR, DISLIKE CAR
    10g. FAVORITE PROGRAM, DISLIKE PROGRAM
    10h. SPORT ONE HOPES FOR PLAYING
    10i. INTERESTED SPORT
    10j. FAVORITE ACTOR OR ACTORESS, DISLIKE ACTOR OR ACTRESS
    10k. WHICH DO YOU GO FOR FUN TO MOUNTAIN OR SEA ?
    10l. DO YOU LIKE GAME OR NOT ?
    10m. WHICH DO YOU HAVE A TENDENCY TO YIELD TO THE POWERFUL OR TO BE DROVED ?

| PARTICIPANT / PROFILE | A | B | C | D | E | F | G | H | I | J | K | L | M | N | O | P |
|---|---|---|---|---|---|---|---|---|---|---|---|---|---|---|---|---|
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |
| 10 | | | | | | | | | | | | | | | | |

F I G. 21

| ITEM NO. | PROFILE ITEMS | A NUMBER OF SEARCHED MATERIALS | RESULT OF SEARCH | PRIORITY | COMMON ITEM | WEIGHTING (%) | COMPLETE DATA OF PROFILE INFORMATION OF THE PARTICIPANTS | | | TOTAL |
|---|---|---|---|---|---|---|---|---|---|---|
| No. 1 | SEX | 351 | YES | 1 | WOMEN | 75% | WOMEN 12 | MEN 4 | | 16 |
| No. 2 | AGE | | NO | 5 | FOURTIES | 44% | FOURTIES 7 | THIRTIES 6 | TEENS 3 | 16 |
| No. 3 | ADDRESS | 120 | YES | 2 | TOKYO | 63% | TOKYO 10 | YOKOHAMA 5 | OMIYA 1 | 16 |
| No. 4 | HOMETOWN | | NO | 4 | OKINAWA | 50% | OKINAWA 8 | OSAKA 5 | TOKYO 3 | 16 |
| No. 5 | HOBBY | | NO | 7 | MOVIE | 25% | MOVIE 4 | READING 3 | PAINTING 2 | 16 |
| No. 6 | COKKING | 30 | YES | 3 | EGG FOODS | 56% | EGG FOODS 9 | FISH 5 | MEAT 2 | 16 |
| No. 7 | PET | | NO | 5 | DOG | 44% | DOG 7 | CAT 5 | BIRD 4 | 16 |
| No. 8 | SPORTS | | NO | 7 | GOLF | 25% | GOLF 4 | SKI 3 | TENNIS 3 | 16 |

1ST GROUP    2ND GROUP    3RD GROUP

| DISCLOSURE LAYERS OF RELATED MATERIALS | SETS OF SEACH | A NUMBER OF MATERIALS | THEME TO BE DISTRIBUTED |
|---|---|---|---|
| 1ST LAYER | No. 1 (FEMALE) | 351 | NONE |
| | No. 3 (TOKYO) | 120 | |
| | No. 6 (EGG FOODS) | 30 | |
| 2ND LAYER | No. 1 AND No. 3 | 63 | GROUP OF COMMON THEME TO BE DISTRIBUTED AT 2ND TIME AS NECESSARY |
| | No. 1 AND No. 6 | 21 | |
| | No. 3 AND No. 6 | 12 | |
| 3RD LAYER | No. 1 AND No. 3 AND No. 6 | 4 | FIRST DISTRIBUTED COMMON THEME |

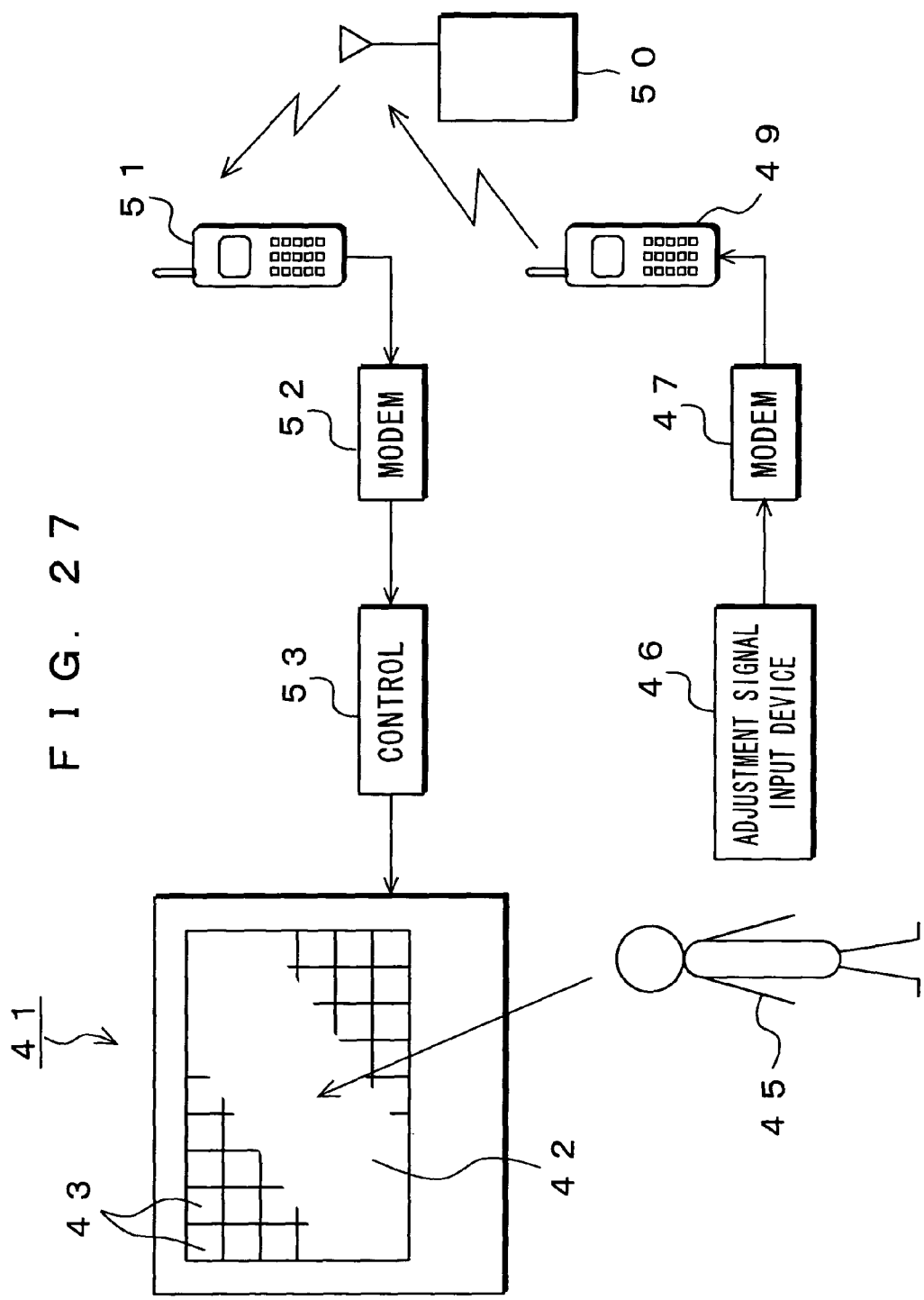

DISTRIBUTION SYSTEM AND DISTRIBUTION METHOD

TECHNICAL FIELD

The invention relates to a distributing system and a distributing method each for providing a variety of kinds of distribution services for a user of a portable terminal apparatus specified on the basis of individual identification (ID) information stored in servers etc. interconnected through a network. More specifically, it relates to a distributing system and a distributing method each for providing a variety of kinds of distribution services using a large-sized image display means for portable terminal apparatus staying within a predetermined area where the apparatus wirelessly can communicate with a base station provided in relation to the large-sized image display means.

BACKGROUND DESCRIPTION

Recently, services available for retrieving or downloading various kinds of pieces of information using portable terminal apparatus have been propagated. In such the services, there has been a growing interest in identification of an individual user who receives the services, the identification being necessary when receiving the services, and in improvement on data security.

As to identifying individuals, it has conventionally been proposed that, to permit only a specific person registered beforehand to use his or her portable terminal apparatus, the portable terminal apparatus have a function to identify individuals. For example, there has been such the portable terminal apparatus for mobile communication and an individual identification method as disclosed in the publication (see Japanese Patent Laid-Open Publication No. H11-262059).

FIG. 26 is a block diagram showing the portable terminal apparatus for mobile communication disclosed in this Japanese Patent Laid-Open Publication. ROM 60 mounted in the portable terminal apparatus stores sets of fingerprint data of users as sets of the individual identification (ID) data beforehand.

Upon power application to the portable terminal apparatus, the individual ID data stored in the ROM 60 (nonvolatile memory) is retrieved and temporarily stored in RAM 59 (volatile memory) that is capable of high-speed access. First, a user presses a transmission button 56 provided with a fingerprint identification sensor 57 on a Liquid Crystal Display (hereinafter called LCD) 56 of portable terminal apparatus. He or she then enters a telephone number and presses the transmission button 56 on the LCD again, thereby performing transmission processing.

During this transmission procedure, when the transmission button 56 is first pressed, the fingerprint identification sensor 57 reads his or her fingerprint, types of which are converted to dot patterns, and then they are processed as data. A fingerprint identification circuit 58 compares sets of the fingerprint data thus acquired with sets of the individual ID data stored as fingerprint data when the user has bought the portable terminal apparatus, and then if they mismatch, the transmission is disabled. Only when they match, the user can enter the telephone number successfully, and then the transmission processing is performed through a communication-processing unit 61 and a wireless-processing unit 62.

By this method, however, the individual is identified at the portable terminal apparatus side so that the portable terminal apparatus has a large load of information processing imposed thereon, thereby accompanying large power consumption. Therefore, it is difficult to downsize the portable terminal apparatus and to make it power-thrifty. Further, each portable terminal apparatus can be used by only one specific individual, not by any others, that is, in a fixed one-to-one relationship between the portable terminal apparatus and the individual, thus lacking in flexibility.

Also has known such a conventional type of display system that gives an outdoor advertisement by setting image display device using a cathode-ray tube, discharge tube, light-emitting diodes or the like outdoors, in station premises, or on passages and supplying advertisement image such as a moving or still picture to that image display device.

By thus displaying an advertisement image etc. on an outdoor advertisement system installed in such a place, it is possible to always display the information of the moving or still picture and continuously supply that advertisement to many unspecified people passing by there.

Also, to display an advertisement image at an outdoor advertisement system installed at such a place, each image display device has usually been provided with equipment for storing and reproducing a relevant image program, wherein specified information is displayed thereon.

When, however, such a large-sized image display apparatus is used to display the contents of an advertisement to many unspecified passers-by, even if any one of them is interested in the advertisement material and want to get further information related to the displayed material, he or she cannot get it on the spot.

Alternatively, since there provides each image display apparatus with equipment for storing and reproducing the image program, it is difficult to appropriately control display of the advertisement material on the plural pieces of the large-sized image display apparatus.

Further, a large-sized image display system that combines large-sized image display apparatus and portable terminal apparatus has been known. For example, Japanese Patent Laid-Open Publication No. H11-262035 discloses a contacting method wherein during the adjustment of such the large-sized image display apparatus, the apparatus is observed remotely so that based on the observation result thereof the adjustment may be conducted at the set place of that large-sized image display apparatus.

FIG. 27 is a diagram showing a configuration of the large-sized image display system disclosed in the above publication. An image display portion 42 of the large-sized image machine 41 is comprised of many units 43 arrayed both vertically and horizontally. A transmitter side includes an adjustment signal input device 46 for allowing an operator 45 who observes the brightness, hue, etc. of an image displayed at the units 43 to input adjustment data on the basis of the observed ones, a MODEM 47 for linking this data over a telephone line, and a portable telephone 49 for transmitting the data.

A receiver side includes a portable telephone 51 for receiving a radio wave transmitted from a central office 50, a MODEM 52 for converting it to a control signal, and a control device 53.

In this configuration, the operator 45 who stays at a position away from the image display portion 42 of the large-sized image machine 41 by a predetermined distance observes the brightness, hue, etc. of an image (a part of the image) displayed on the units 43. Based on the observation result thus obtained, the operator 45 also enters sets of the data such as the number of the unit 43 and the brightness, hue, etc. to be adjusted into the adjustment signal input device 46. The sets of data thus entered are transferred to the portable telephone 51 through the MODEM 47, the portable telephone 49, and the central office 50.

The sets of data thus received at the portable telephone 51 are converted to a variety of kinds of sets of the control data at the MODEM 52 and then entered to the control device 53. The units 43 are controlled by the control device 53 based on these sets of the data so that they can be set in an image display state intended by the operator 45.

Although the large-sized image display system as shown in FIG. 27 uses a portable telephone as the portable terminal apparatus, this portable telephone cannot retrieve or download various pieces of information from a display screen of the image display portion 42 of the large-sized image machine 41 because it only transmits and receives the adjustment signal for adjusting the units 43.

It is an object of the invention to provide a distributing system that enables a user of a portable terminal apparatus to be identified as an individual, that enables plural users to use the same terminal apparatus, that enables the terminal apparatus to be downsized and the power dissipation thereof to be saved, and also that enables solidarity of owners themselves of the portable terminal apparatus to be grown. It is another object of the invention to provide a distributing system and a distributing method each available for identifying an individual, whereby the individual is easy accessible to the information related to materials displayed on a large-sized image apparatus so that convenience of accessing (distributing) information can be enhanced, and whereby solidarity of owners themselves of the portable terminal apparatus can be grown.

DISCLOSURE OF THE INVENTION

A distributing system according to the invention comprises a base apparatus having distributive information storage means for storing a piece of informational data to be distributed and individual identification data storage means for storing pieces of individual identification data beforehand, the base apparatus performing wireless communication including transmission of the piece of informational data, and a portable terminal apparatus having individual identification information acquiring means for acquiring user's individual identification information and means for transmitting the individual identification information acquired by the individual identification information acquiring means, the portable terminal apparatus performing wireless communication including reception of the piece of informational data from the base apparatus with the base apparatus within a predetermined area around the base apparatus, wherein the base apparatus compares the individual identification information received from the portable terminal apparatus to the pieces of individual identification data stored in the individual identification data storage means, and wherein when any one of said pieces of individual identification data matching the individual identification information is specified, the base apparatus transmits the piece of informational data stored in the distributive information storage means to the portable terminal apparatus.

In this distributing system related to the invention, a comparison/selection means included in the base apparatus compares the individual identification information received from the portable terminal apparatus to the pieces of individual identification data stored in the storage means, the individual identification information having been acquired by the individual identification information acquiring means, to specify an individual, so that each of the individual users who use the portable terminal apparatus can be identified, thus enabling plural users to use one portable terminal apparatus. Further, the storage means and the comparison/selection means are provided on the base apparatus side, so that the portable terminal apparatus requires fewer processing functions, thus enabling downsizing the portable terminal apparatus and saving power dissipation thereof.

Another distributing system related to the invention comprises plural base apparatuses each for performing wireless communication including data transmission, a central processing station including distributive information storage means for storing a piece of informational data to be distributed and individual identification data storage means for storing pieces of individual identification data beforehand, the central processing station being connected with each of the plural base apparatuses through a communication line to distribute the piece of informational data to each of the base apparatuses, and portable terminal apparatuses each including individual identification information acquiring means for acquiring user's individual identification information and means for transmitting to said base apparatus the individual identification information acquired by the individual identification information acquiring means, the portable terminal apparatus performing wireless communication with the base apparatuses within a predetermined area around each of the base apparatuses, the communication including reception of the piece of the informational data obtained from the central processing station through the communication line, wherein the central processing station further comprises control means for allowing the individual identification information transmitted from the portable terminal apparatus to the base apparatus, the individual identification information being then received through the communication line, to be compared to the pieces of individual identification data stored in the individual identification data storage means, and wherein the central control means allows the piece of informational data to be distributed to the base apparatuses for transmitting the piece of informational data to the portable terminal apparatus when any one of the pieces of individual identification data matching the individual identification information is specified.

In this distributing system related to the invention, the central control means allows for comparing the individual identification information transmitted from the portable terminal apparatus to the pieces of individual identification data stored in the storage means, the individual identification information having been acquired by the individual identification information acquiring means, to specify an individual, so that each of the individual users who use the portable terminal apparatus can be identified, thus enabling plural users to use the same portable terminal apparatus. Further, the storage means and the comparison/selection means are provided on the central processing station side, so that the portable terminal apparatus requires fewer processing functions, thus enabling downsizing the portable terminal apparatus and saving power dissipation thereof.

Also, in the distributing system related to the invention, preferably each of the portable terminal apparatuses has input capture means for capturing a piece of processed data of character and/or image, and transmits the piece of processed data and the individual identification information to the base apparatus. The central processing station includes storage means for storing the piece of processed data obtained from each of the base apparatuses through the communication line, and the central control means thereof allows for processing the piece of processed data stored in the storage means to a piece of process data, and for transmitting the piece of process data to the base apparatus through the communication line to distribute the piece of process data to each of the portable terminal apparatuses.

In this distributing system related to the invention, the portable terminal apparatus inputs and outputs character and image data, and the central processing station processes such data, thereby reducing the required processing functions of the portable terminal apparatus. This enables downsizing the portable terminal apparatus and saving power dissipation thereof.

Further distributing system related to the invention comprises a base apparatus including large-sized image display means and distributive information storage means for storing a piece of informational data to be distributed in relation to each material displayed on the large-sized image display means, the base apparatus performing wireless communication including transmission of the piece of informational data, and a portable terminal apparatus for performing wireless communication with the base apparatus, the wireless communication including reception of the piece of informational data transmitted from the base apparatus within a predetermined area around the base apparatus, wherein when any one of the materials is being displayed on the large-sized image display means, the base apparatus transmits to the portable terminal apparatus the piece of informational data stored in the distributive information storage means, the informational data corresponding to the material.

Also, in addition to the above-mentioned configuration, in this distributing system related to the invention, the portable terminal apparatus comprises the portable terminal apparatus including individual identification information acquiring means for acquiring individual identification information of a user and means for transmitting the individual identification information acquired by the individual identification information acquiring means, and the base apparatus further includes individual identification data storage means for storing pieces of individual identification data beforehand, wherein the base apparatus compares the individual identification information transmitted from the portable terminal apparatus to the pieces of individual identification data stored in the individual identification data storage means, and wherein when any one of the pieces of individual identification data matching the individual identification information is specified, the base apparatus transmits to the portable terminal apparatus the piece of informational data stored in relation to the material displayed on the large-sized image display means.

A further another distributing system related to the invention comprises plural base apparatuses each having large-sized image display means and performing wireless communication, a central processing station including distributive information storage means for storing a piece of informational data to be distributed in relation to each material displayed on the large-sized image display means, the central processing station being connected with each of the pieces of base apparatus through a communication line to distribute the informational data to each of the base apparatuses, and portable terminal apparatus performing wireless communication with the base apparatuses within a predetermined area around each of the base apparatuses, the communication including reception of the piece of informational data obtained from the central processing station through the communication line, wherein when any one of the materials is being displayed on the large-sized image display means, each of the base apparatuses transmits the piece of informational data stored in the distributive information storage means, the informational data corresponding to the material.

Also, in addition to this configuration, in this distributing system related to the invention, the portable terminal apparatus includes individual identification information acquiring means for acquiring individual identification information of a user and means for transmitting the individual identification information acquired by the individual identification information acquiring means to the base apparatus, and the central processing station further includes individual identification data storage means for storing pieces of individual identification data beforehand, wherein the central processing station compares the individual identification information transmitted from the portable terminal apparatus to the base apparatus and distributed through the communication line to the pieces of individual identification data stored in the individual identification data storage means, and performs a control for allowing the informational data to be distributed to the base apparatus to transmit the information to the portable terminal apparatus when any one of the pieces of individual identification data matching the individual identification information is specified.

A distributing method related to the invention for wirelessly transmitting to a portable terminal apparatus a piece of informational data from a base apparatus having distributive information storage means for storing the piece of informational data to be distributed, comprises the steps of acquiring user's individual identification information using individual identification information acquiring means implemented in the portable terminal apparatus and then wirelessly transmitting the individual identification information thus acquired to the base apparatus, receiving at the base apparatus the individual identification information transmitted from the portable terminal apparatus and then comparing the individual identification information to pieces of individual identification data stored beforehand in the individual identification data storage means implemented in the base apparatus, and transmitting the piece of informational data stored in the distributive information storage means to the portable terminal apparatus when any one of the pieces of individual identification data matching the individual identification information is specified.

Also, another distributing method related to the invention for wirelessly transmitting a piece of informational data to be distributed to portable terminal apparatus separately from plural base apparatuses each connected through a communication line to central processing station having distributive information storage means for storing the piece of informational data, comprises the steps of acquiring individual identification information of a user using individual identification information acquiring means implemented in the portable terminal apparatus and then wirelessly transmitting to the base apparatus the individual identification information thus acquired, receiving at the base apparatus the individual identification information thus transmitted from the portable terminal apparatus and then transmitting the individual identification information to the central processing station through the communication line, comparing at the central processing station the individual identification information transmitted from the base apparatus to pieces of individual identification data stored beforehand in individual identification data storage means implemented in the central processing station, allowing the piece of informational data stored in the distributive information storage means to be distributed through the communication line to the base apparatuses when any one of the pieces of individual identification data matching the individual identification information is specified, and transmitting the piece of informational data to the portable terminal apparatus from the base apparatus receiving the piece of informational data distributed through the communication line.

Also, a further distributing method related to the invention for wirelessly transmitting to a portable terminal apparatus a piece of informational data from a base apparatus including a large-sized image display and distributive information storage means for storing the piece of informational data to be distributed in relation to each material displayed on the large-sized image display, comprises the steps of displaying one of the materials on the large-sized image display, acquiring individual identification information of a user using individual identification information acquiring means implemented in the portable terminal apparatus and then wirelessly transmitting the individual identification information thus acquired to the base apparatus, receiving at the base apparatus the individual identification information transmitted from the portable terminal apparatus and then comparing the individual identification information to a piece of individual identification data stored beforehand in individual identification data storage means implemented in the base apparatus, and allowing the piece of informational data corresponding to the material displayed on the large-sized image display means, the piece of informational data being stored in the distributive information storage means, to be transmitted to the portable terminal apparatus when any one of the pieces of individual identification data matching the individual identification information is specified.

Also, a further another distributing method related to the invention, using comprised of plural base apparatuses each having a large-sized image display means, and a central processing station having distributive information storage means for storing a piece of informational data to be distributed in relation to each material displayed on the large-sized image display means, for wirelessly transmitting the piece of informational data to portable terminal apparatuses separately from the plural base apparatuses each connected through a communication line to the central processing station, comprises the steps of displaying one of the materials on the large-sized image display means, acquiring individual identification information of a user using individual identification information acquiring means implemented in the portable terminal apparatus and then wirelessly transmitting the individual identification information thus acquired to the base apparatus, receiving at one of the base apparatuses the individual identification information transmitted from the portable terminal apparatus and then transmitting the individual identification information to the central processing station through the communication line, comparing, at the central processing station, the individual identification information transmitted from the base apparatus to pieces of individual identification data stored beforehand in individual identification data storage means implemented in the central processing station, distributing the piece of informational data stored in the distributive information storage means to the base apparatuses through the communication line when any one of the pieces of individual identification data matching the individual identification information is specified, and transmitting the piece of informational data from the base apparatus distributed through the communication line to the portable terminal apparatus, the piece of informational data corresponding to the material displayed on the large-sized image display means.

BRIEF DESCRIPTION OF THE DRAWINGS

FIG. 2 is an illustration for showing confirmation of an image of its own apparatus;

FIG. 3 is a configuration example of a distributing system;

FIG. 15 is a configuration diagram for showing general part of another example of a distributing system related to the invention;

FIG. 16 is a diagram for showing an example of profile information;

FIG. 21 is a diagram illustrating an example of the profile information;

FIG. 27 is an illustration for showing a configuration example of a conventional distributing system, which combines a large-sized image device and a portable terminal apparatus.

BEST MODE FOR CARRYING OUT THE INVENTION

Figure 1:
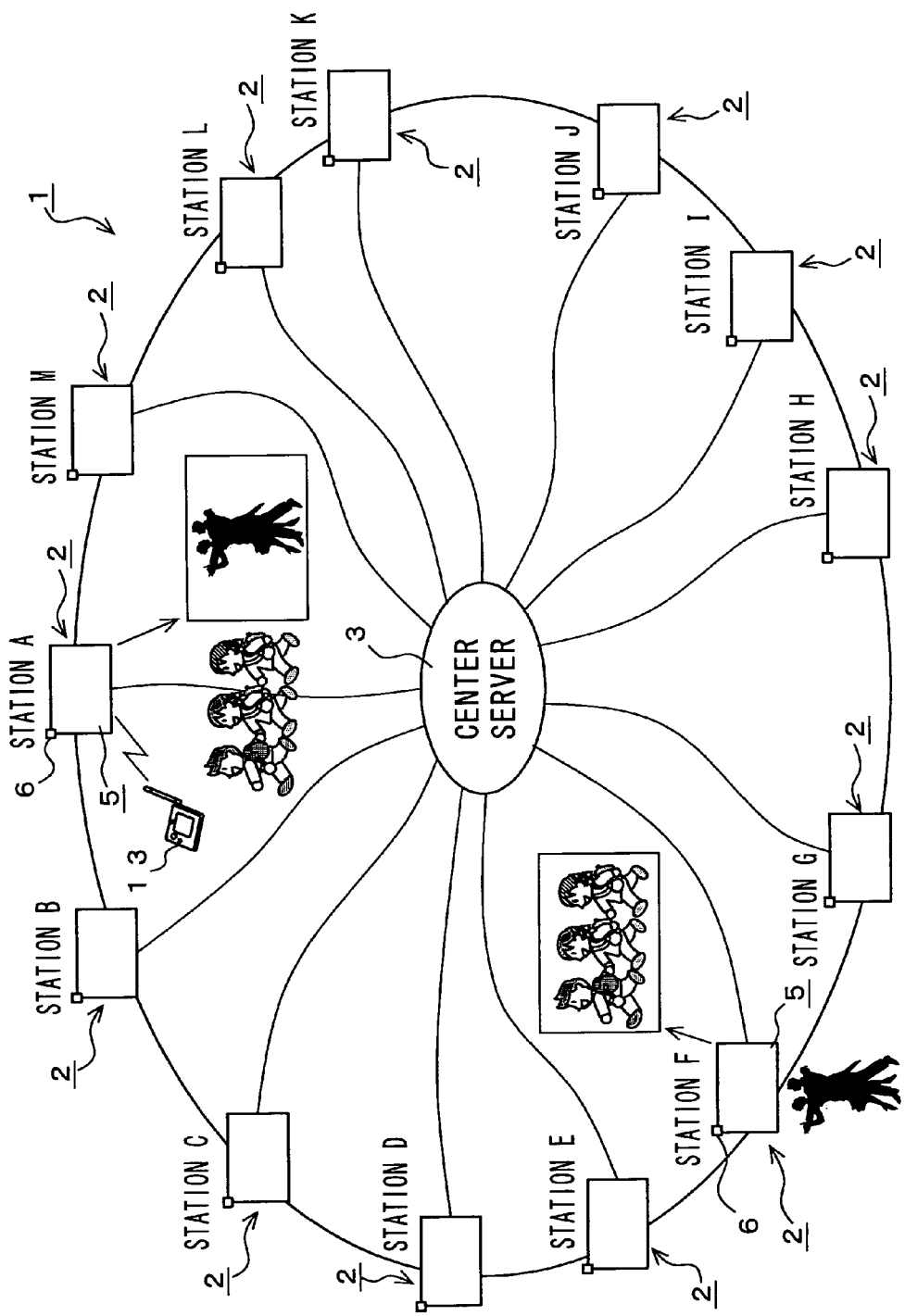
FIG. 1 is a schematic configuration diagram for showing an example of a distributing system related to the invention.

The following will describe one embodiment of a distributing system using a large-sized image device related to the invention with reference to the drawings. FIG. 1 is a schematic configuration diagram showing an example of a distributing system related to the invention wherein a large-sized image device is used and a central control apparatus (a center server) distributes information.

A distributing system 1 using a large-sized image device roughly includes large-sized image displays 5 positioned at various meeting places, base apparatuses 2 for wireless communication each equipped with a video camera 6 for imaging the surroundings of the large-sized image display 5, and the like, a center server 3 in the central control apparatus connected with each base apparatus 2 through a line, and a personal digital assistant (PDA) 13 which is a portable terminal apparatus for wireless communication with the base apparatus 2. Each of the large-sized image displays 5 may use a high-definition large-sized image display means such as an LED display made up of LED elements arrayed in a matrix, a video wall or a projector which uses a large screen wherein display devices such as LCD panels are vertically and horizontally arranged with them being adjacent to each other.

Also, the distributing system 1 of this embodiment provided with the plural base apparatuses 2 each having the large-sized image display 5, the center server 3 connected through the line to each of the plural base apparatuses 2, and the PDA 13 capable of wireless communication with each base apparatus 2 to obtain information therefrom further includes individual identification information acquisition means, provided for the PDA 13, for acquiring user's individual identification information and also a storage means and a comparison/selection means, which are provided to the base apparatus 2 or the center server 3, the storage means storing individual identification data for each individual identification code beforehand, the comparison/selection means comparing individual identification information sent from each of the portable terminal apparatuses to pieces of the individual identification data stored beforehand in this storage means, to thereby specify the individual identification code so that the PDA 13 can get information from the base apparatus 2 if the comparison/selection means specifies the individual identification code.

The following will describe a specific display example using the base apparatus 2 and the large-sized image display 5 in the distributing system according to this embodiment. As shown in FIG. 1, for example, the base apparatus 2, the large-sized image display 5, the video camera 6, and the like are installed at the meeting place of each station on a loop line. The large-sized image display 5 is used to display a large-sized image, while the video camera 6 is used to photograph an audience gathering around the apparatus itself. The base apparatus 2 of each meeting place is connected through the line to the center server 3 in a network.

On the large-sized image display 5 at the meeting place of station A is displayed an image of a dancing couple photographed by the video camera 6 at meeting place of station F, while on the large-sized image display 5 at any meeting place of station F is displayed an image of children photographed by the video camera 6 at the meeting of station A. Thus, the large-sized image display 5 of each meeting place displays thereon an image of the meeting place different from its own meeting place, thereby allowing the viewer to enjoy seeing displayed images of various meeting places.

FIG. 2 is an illustration for showing confirmation of the image captured by the camera of its own apparatus. The large-sized image display 5 in principle displays an image captured by the video camera 6 positioned in any meeting place other than the meeting place of its own apparatus or an image distributed from the side of the center server 3, such as the image stored in a storage means 31, which will be described later, provided as an information supply means. The large-sized image display 5 positioned on its own apparatus can also naturally display an image captured by the video camera 6 of its own apparatus.

The video camera 6 referred to here is not limited to that provided to the base apparatus 2 at each meeting place, but may be that installed at any place away from and other than place of the base apparatus 2, such as a concert hall, an event place, and a base ball stadium.

A picture-in-picture scheme employed makes it possible to incorporate and display an image captured by its own apparatus in a part of a large-sized image displayed on the large-sized image display 5 to thereby allow the viewer to confirm that image by its own apparatus. For example, although an image of children captured by the vide camera 6 of the meeting place of station A is displayed on the large-sized image display 5 at the meeting place of station F, this large-sized image display 5 may incorporate and display an image 5a of a dancing couple captured by the video camera 6 of the its own apparatus by the picture-in-picture scheme. It is possible to enlarge only the image 5a of its own apparatus from its currently displayed state to full-screen sized one of the large-sized image display. It is also possible to switch the image display between the incorporated image 5a and the large-sized one.

The following will describe a configuration and operations of the distributing system according to this embodiment of the invention with reference to an example of a distribution service related to an event of a music band.

The base apparatus 2 used in this distributing system comprises tools as shown in FIG. 3. In a service area of the base apparatus 2, the large-sized image display 5 is positioned. This distributing system 1 is composed of a local processor 7 functioning as the base apparatus 2 connected through the line with the center server 3, the large-sized image display 5, an antenna 11 for wireless communication with personal digital assistant (PDA) 13, which serves as a portable terminal apparatus. As other tools, in an example as shown in FIG. 3, two video cameras 6A and 6B, four microphones 9A, 9B, 9C, and 9D, and three speakers 10A, 10B, and 10C are illustrated.

Above the large-sized image display 5 is arranged the antenna 11 and to the right and left thereof are nearly arranged the vide cameras 6A and 6B, the microphones 9A and 9B, and the speakers 10A and 10B. To the right and left in the front of the large-sized image display 5 are arranged the microphones 9C and 9D and at the center in front thereof is arranged the speaker 10C as a rear speaker. That is, in a space in front of the large-sized image display 5 are positioned the microphones 9A, 9B, 9C, and 9D and the speakers 10A, 10B, and 10C for a purpose of enhancing a sense of reality.

Figure 4:
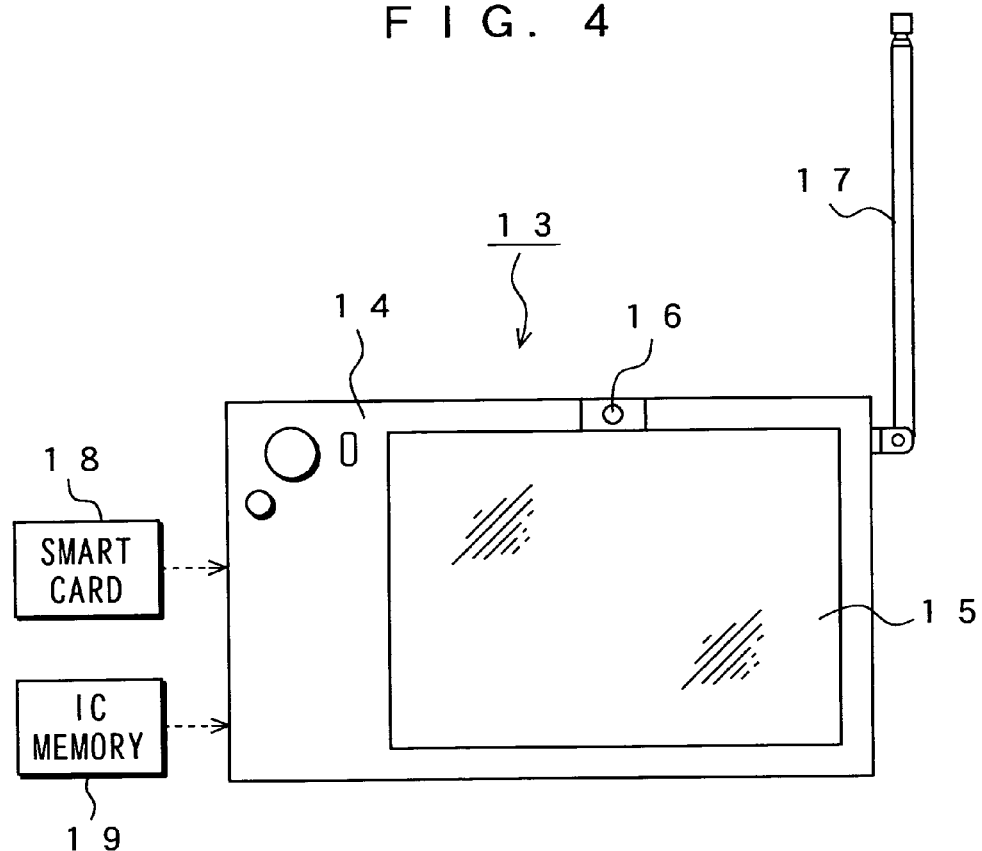
FIG. 4 is an external view for showing a PDA.

FIG. 4 is an external view showing the PDA 13. The PDA 13 comprises a body 14, an LCD unit 15 which also serves as an input portion by means of a stylus and is provided on one face of the body 14, a CCD camera 16 serving as individual identification information acquisition means capable of detecting pupil patterns of users, and an expansive antenna 17 for wireless communication with the base apparatus 2. The CCD camera 16 is so adapted as to be attached to and detached from the body 14, so that it can be separated from the body 14 via a cord (not shown) for capture. To a side of the body 14 can be mounted a smart card 18 and an IC memory 19. The smart card 18 is used to identify the user. The IC memory 19 will be described in detail later.

Figure 5:
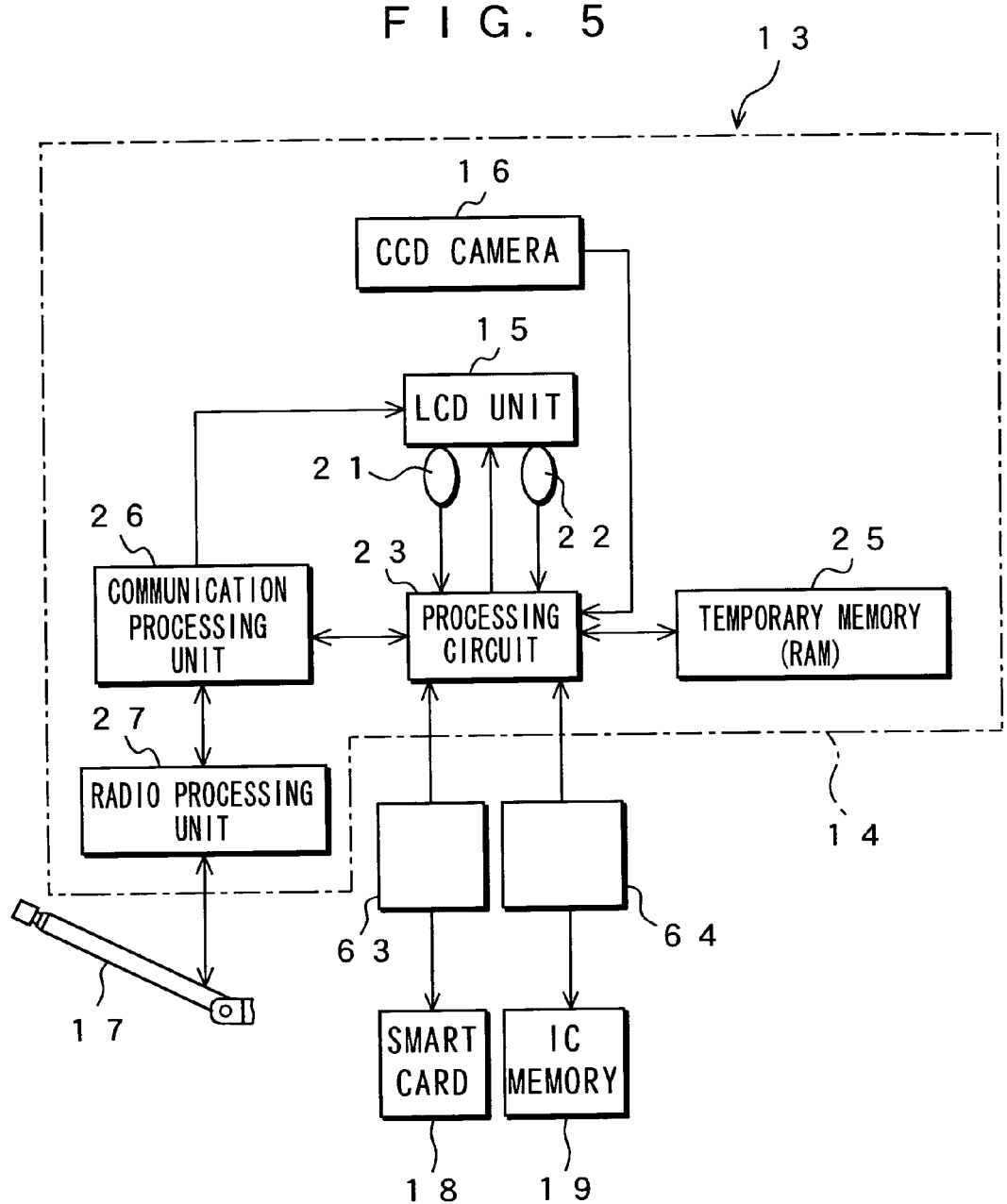
FIG. 5 is a block diagram for showing the PDA.

FIG. 5 is a block diagram showing the PDA. The LCD unit 15 of the PDA 13 is provided with a stylus-input sensor 21 and a fingerprint identification sensor 22 that are served as individual identification information acquisition means. When the user writes specific characters (e.g., signature) using the stylus onto the LCD unit 15, the pen-input sensor 21 reads the written characters and then a processing circuit 23 converts their shapes into a dot pattern as data. If, on the other hand, the user presses a specific part of the LCD unit 15 downwardly by his or her, for example, thumb, the fingerprint identification sensor 22 reads his or her fingerprint out and then the processing circuit 23 converts its shape into a dot pattern as data. If the pressing position is shifted off a proper position, the center of the fingerprint is found for correction. The CCD camera 16 detects a pattern of the pupil of user, and then the processing circuit 23 converts a shape of the pupil pattern into a dot pattern as data.

Thus, the processing circuit 23 receives the data relating to the individual identification given through the stylus-input sensor 21, the fingerprint identification sensor 22, and the CCD camera 16 and processes it. To the processing circuit 23 is connected a temporary memory (RAM) 25 wherein the data processed by the processing circuit 23 may be stored temporarily and the data temporarily stored therein may be read out to the processing circuit 23. The data processed at the processing circuit 23 is transmitted as individual identification information of the user using the relevant PDA from the antenna 17 as a radio wave through a communication processing unit 26 and a wireless processing unit 27.

The antenna 17 of the PDA 13, on the other hand, receives a radio wave transmitted from the antenna 11 of the base apparatus 2 and the communication processing unit 26 receives and processes it via the wireless processing unit 27 to display the process information directly on the LCD unit 15 or through the processing circuit 23 on the LCD unit 15. The smart card 18 is connected through a smart card reader 63 to the processing circuit 23 and the IC memory 19 is connected through an IC memory slot interface 64 to the processing circuit 23.

In addition to the above processing functions, the processing circuit 23 has various functions such as instruction functions for disclosing profile information of the individual according to instructed level of information disclosure of the individual, which will be described, and for instructing distribution of the profile information after distributing an announcement (introduction information) of the individual.

Figure 6:
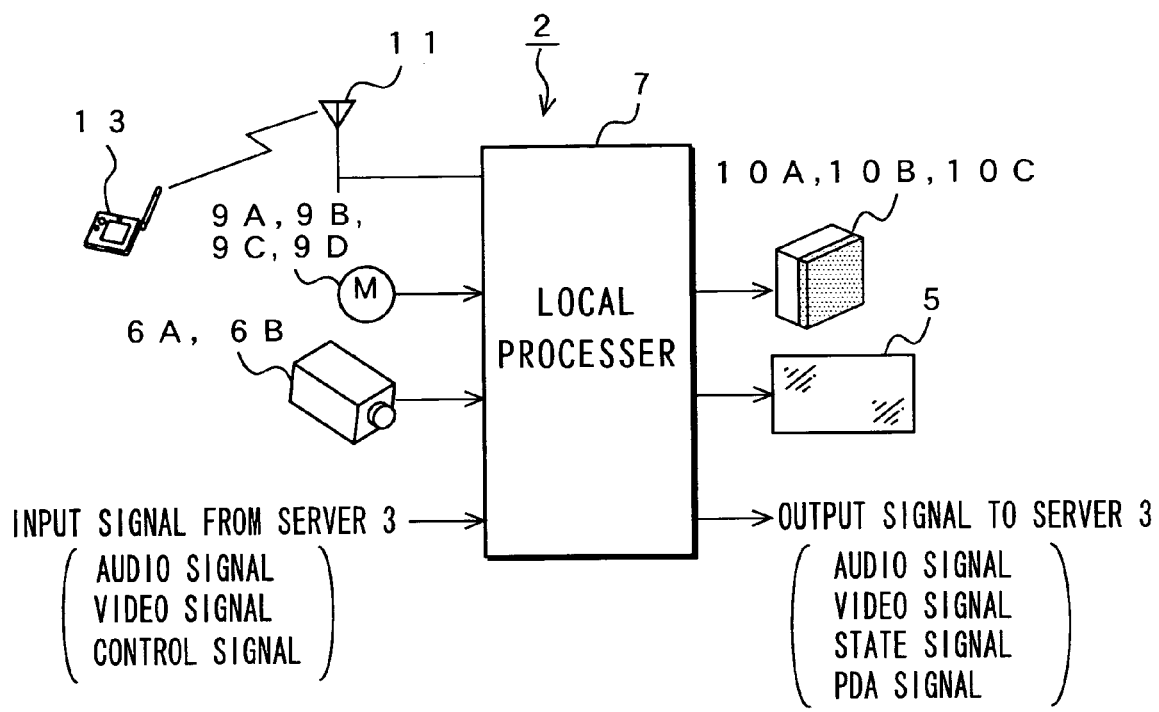
FIG. 6 is a block diagram for showing a base apparatus.

FIG. 6 is a block diagram for showing the base apparatus 2. The local processor 7 receives an audio signal (voice information) from each of the four microphones 9A, 9B, 9C, and 9D, a video signal (image information) from each of the two video cameras 6A and 6B, and distributive information on an audio signal, a video signal, and the like, a control signal and the like, from the center server 3.

Herein, I refer to these audio signal, video signal, and control signal from the center server 3 as the control signals or the like for controlling, for example, various voices, images, stream data, addition data, and banner advertisements (e.g., vertical or horizontal movie captions given at part of the image).

To the local processor 7 is further connected the antenna 11 where it may receive and process a radio wave from the PDA 13 or it may transmit a radio wave to the PDA 13 for communication therewith.

The local processor 7, on the other hand, transmits an audio signal to the three speakers 10A, 10B, and 19C and also a vide signal to the large-sized image display 5. The local processor 7 generates the data to be transmitted to the large-sized image display 5, based on the predetermined processing contents or the contents specified by the center server 3. At the same time, it transmits to the center server 3 a monitor signal of the large-sized image display 5, monitor signals from the video cameras 6A and 6B, audio signals from the microphones 9A, 9B, 9C, and 9D, an input signal from the PDA 13, and state signals indicating the current state of various tools.

Then, in the configuration such as shown in FIG. 1, an image of the video camera 6 of the meeting place at station A is displayed as a large-sized image on the large-sized image display 5 of the meeting place at station F, while at the same time voices of the microphones 9A, 9B, 9C, and 9D of the meeting place at station A are output as sounds from the speakers 10A, 10B, and 10C of the meeting place at station F; similarly, an image of the video camera 6 of the meeting place at station F is displayed as a large-sized image on the large-sized image display 5 of the meeting place at station A, while at the same time voices of the microphones 9A, 9B, 9C, and 9D of the meeting place at station F are output as sounds from the speakers 10A, 10B, and 10C of the meeting place at station A. Thus, the image information and the voice information can be transferred bilaterally to greatly enhance the sense of participation of the audience, thus improving the event effects.

Figure 7:
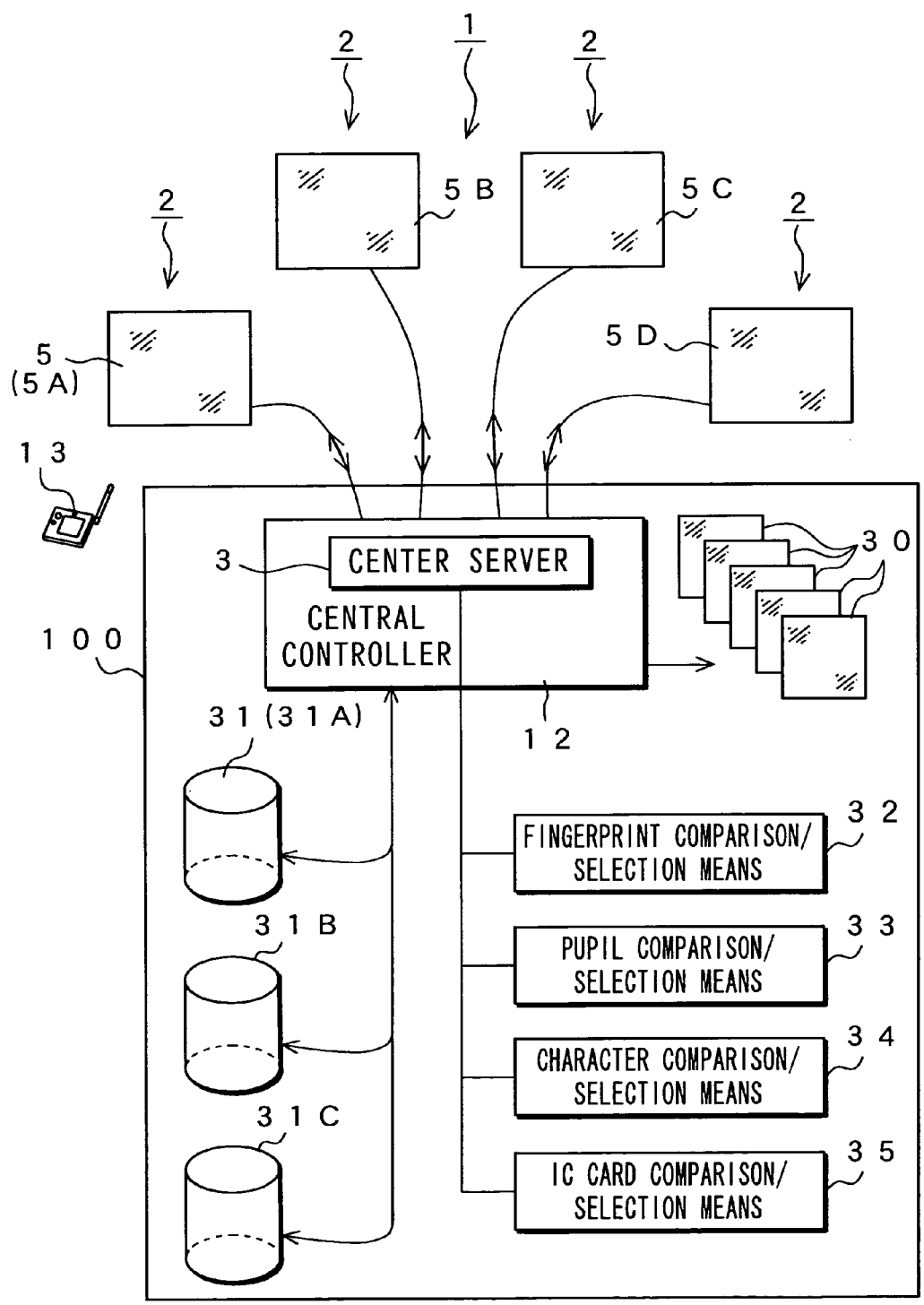
FIG. 7 is a block diagram for showing a central processing station.

FIG. 7 is a block diagram of the central processing station 100, showing processing executed at a center 100 serving as the central processing station 100 in which the center server 3 is installed. The large-sized image display 5 positioned on each location is connected through the local processor 7 and the line to a central controller 12 including the center server 3. The central controller 12 is provided with many monitors 30, 30, . . . each for displaying images sent to the large-sized image display 5 of each base apparatus or images received from the video cameras 6A and 6B of each base apparatus.

To the central controller 12 is further connected a storing device 31 for storing a variety of kinds of information. The storing device 31 comprises plural storage means such that, in this shown case, therein are provided storage means for storing image/speech/character information file 31A including various pieces of image information, voice information and character information such as various data, storage means for storing terminal ID data file 31B including identification (ID) data of the portable terminal apparatus, and storage means for storing an individual ID data file 31C including identification (ID) data of individuals.

If the storing device 31 for storing such various pieces of information is disposed physically away from the central controller 12, it may be included in a concept of the central controller 12, provided that it can play a functional role in this embodiment.

Related information corresponding to a display material is stored in the image/speech/character information file 31A. For example, corresponding to an image material of an event of a music band, identification information of that image material is added thereto, with various kinds of character information of the career and expected concerts of that music band, image records of the concerts, and banner advertisements, etc., being stored therein as data. In this case, as far as having correspondence with the identification information thus added, the materials to be displayed may be not only those already recorded but also live concerts to be recorded in future. Also, correspondence with the display material may be given not only by the identification information added to the data but also by something utilizing data management by use of a directory having a hierarchy or database application.

Announcement information related to the profile information or the like is also stored in this information file 31A. Herein, I refer to the announcement information as being reference information when distributing profile information after having distributed reference information on owners (participants) of the portable terminal apparatus participated in an event at the meeting place to the participants prior to the distribution of the profile information.

Also, a terminal ID code of the portable terminal apparatus, position information of a large-sized image display currently belonging thereto for each terminal ID code, an individual ID code currently belonging thereto, and the like are stored in the terminal ID data file 31B. In addition to the individual ID code, pieces of the fingerprint data, the pupil pattern data, the character pattern data, and the smart card data, which are registered for each individual ID code, are stored in the individual ID data file 31C.

The center server 3 is provided with fingerprint comparison/selection means 32, pupil comparison/selection means 33, character (signature) comparison/selection means 34, and smart card comparison/selection means 35, which will be described later. The central controller 12 has at least one attending operator, who controls what images are being displayed on the large-sized image display 5 while watching each of the many monitors 30.

Suppose, for example, that a live concert is carried out as an event of a music band in front of a large-sized display shown as the large-sized image display 5A and captured by the video cameras 6A and 6B, and then it is transmitted to other large-sized image displays 5B, 5C, and 5D as display material thus captured.

Images from the video cameras 6A and 6B of the large-sized image display 5A and voices from the peripheral microphones 9A, 9B, 9C, and 9D are collected to the central controller 12 and subjected to some editing, and then they are distributed to the other large-sized image displays 5B, 5C, and 5D. Also, the things of the audience in front of the large-sized image display sent from each of the large-sized image displays 5B, 5C, and 5D are captured by their respective video cameras 6A and 6B, and then they are sent to the respective other large-sized image displays together with the voices from their respective peripheral microphones 9A, 9B, 9C, and 9D.

At the center 100 where the central controller 12 exists, are set a group of the monitors 30 for displaying the images from the video cameras of each large-sized image display 5 and the images being sent to each large-sized image display 5, so that the operator can watch these monitors 30 to thereby switch various kinds of information for maximizing the performance effects. Thus maximizing the performance effects allows the large-sized image displays 5A, 5B, 5C, and 5D to be unified, thereby resulting in a gathering of a large number of the audience in front of the large-sized image displays 5A, 5B, 5C, and 5D.

Figure 8:
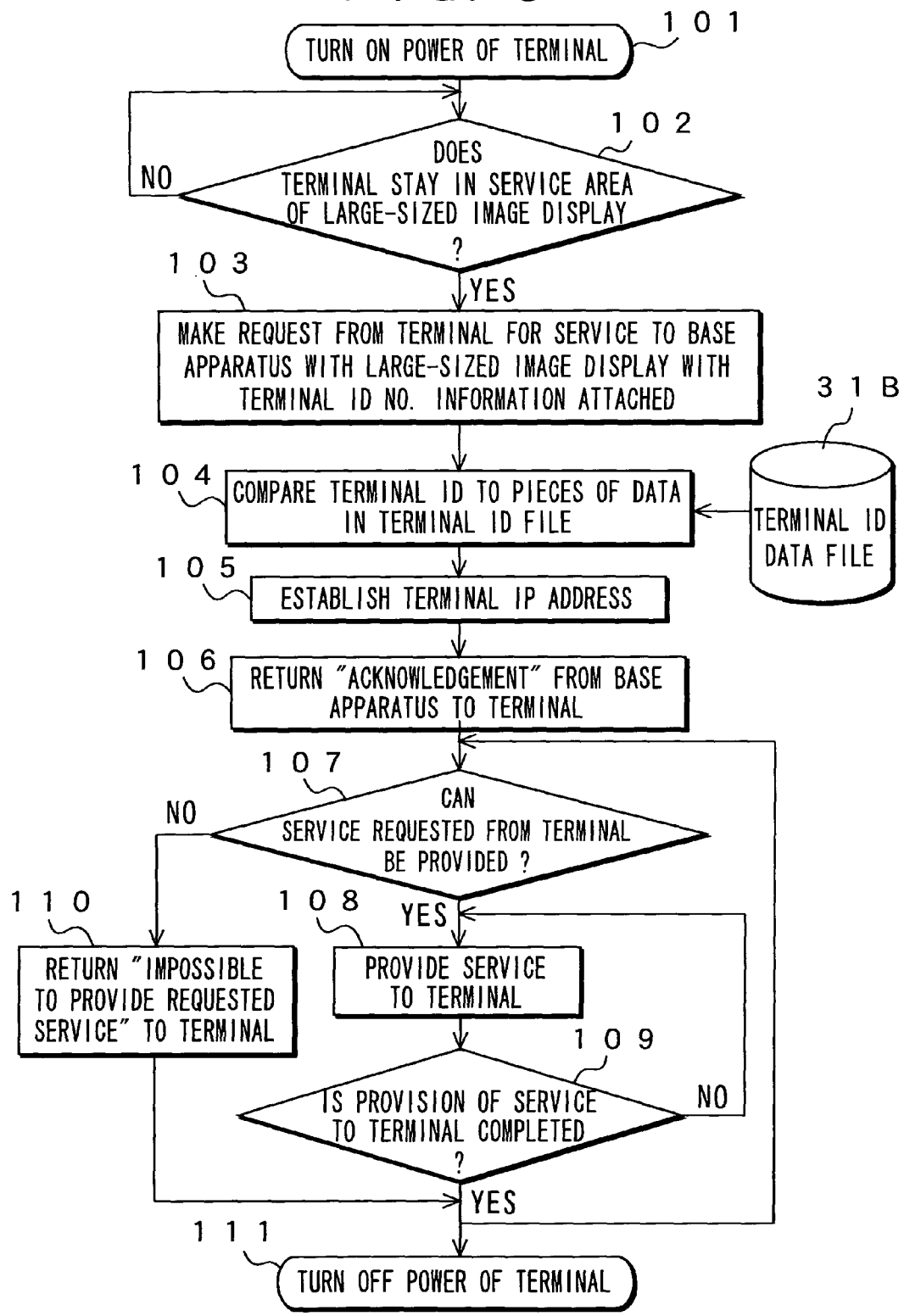
FIG. 8 is a flowchart for showing a flow of information transfer between the base apparatus and the PDA.

The following will describe how to transfer information between the base apparatus with a large-sized image display and the PDA serving as the portable terminal apparatus. FIG. 8 is a flowchart for showing a flow of information transfer between the base apparatus 2 with the large-sized image display and the PDA 13 serving as the portable terminal apparatus.

When power is applied for, e.g. the PDA 13 serving as the portable terminal apparatus (step 101), the PDA 13 intermittently searches for a signal transmitted from the base apparatus 2 to decide whether this PDA 13 stays in a service area of the base apparatus 2 with the large-sized image display (step 102). When the PDA 13 exists in the service area of the large-sized image base apparatus 2 with the large-sized image display, the PDA 13 sends a service request along with its inherent terminal identification (ID) code information to the base apparatus 2 to request it to obtain various kinds of information (step 103).

The base apparatus 2 receives a radio wave transmitted from the antenna 17 of the PDA 13 through the antenna 11 thereof, and the terminal ID code information is sent via the local processor 7 and the line to the central controller 12, where the terminal ID code of the PDA 13 is compared to pieces of the data in the terminal ID data file 31B provided in the storing device 31 (step 104).

If the terminal ID code of this PDA 13 is included in the pieces of data stored in the terminal ID data file 31B, an IP address of this PDA 13 is established (step 105), to enable communication between the PDA 13 and the base apparatus 2, and then the base apparatus 2 returns a message "acknowledged" to the PDA 13 (step 106).

Position information of the base apparatus 2 in a service area to which the PDA 13 having this terminal ID code belongs currently, a version number and a manufacture number of this PDA 13, and the like for each terminal ID code are written into the terminal ID data file 31B, as required. Note here that the terminal ID data file 31B may be installed not only in the central controller 12 but also in each base apparatus 2.

Next, when the PDA 13 requests a desired service, the base apparatus 2 decides whether it can provide the requested service (step 107) and, if positive, it provides this service to the PDA 13 (step 108). Then, it decides whether the provision of this service to the PDA 13 is completed (step 109) and, if positive, the process enters the standby state waiting for a next service request.

If, however, it decides at step 107 that it cannot provide the requested service, the base apparatus 2 returns a message "impossible to provide the requested service" to the PDA 13 (step 110), and then the process enters the standby state waiting for a next service request. Note that the base apparatus 2 decides whether it can provide the requested service because some service require identification of an individual, which will be described later. When the PDA 13 is powered OFF, communication is stopped between the PDA 13 and the base apparatus 2 (step 111).

That is, according to the embodiment, the particular terminal ID code transmitted from the PDA 13 is compared to the pieces of terminal ID data written into the terminal ID data file 31B and then, when the terminal ID code of the PDA 13 is included in the pieces of data, a charge subject is established to then give an IP address to the PDA 13, thus permitting the PDA 13 to communicate with the base apparatus 2. If the portable terminal apparatus 13 itself has an Internet browser function, it is possible to access various kinds of information in the Internet by establishing a link in the Internet.

Figure 9:
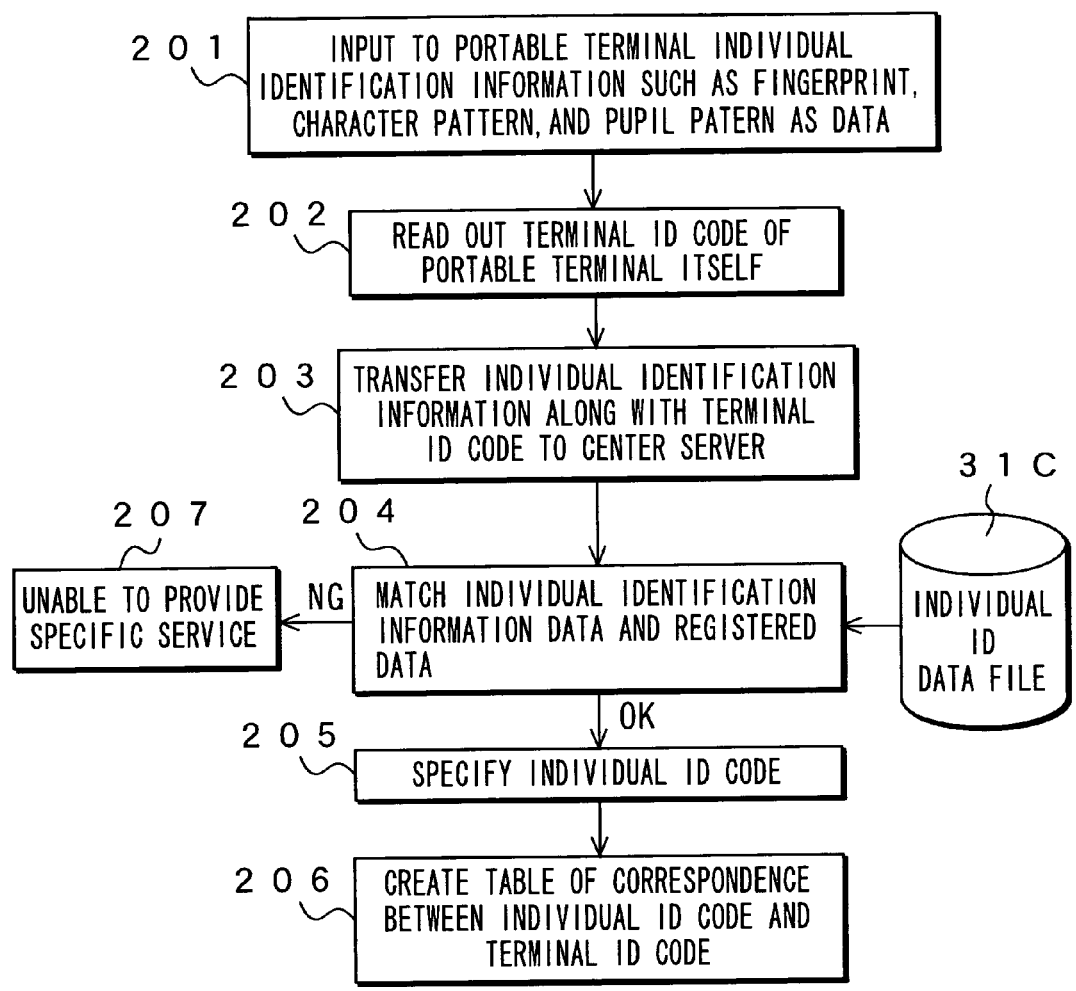
FIG. 9 is a flowchart for showing a flow of identification of an individual.

FIG. 9 is a flowchart for showing a flow of identification of an individual. When the user of the PDA 13 presses, for example, with his thumb, a specific portion of the LCD unit 15, the fingerprint identification sensor 22 reads his/her fingerprint out and then, its shape is converted into a dot pattern as data.

If the user enters a specific character (e.g., signature) with writing it on the LCD unit 15 using the stylus, the stylus-input sensor 21 reads the character out and then, its shape is converted into a dot pattern as data.

Operating the CCD camera 16 allows a pupil pattern of the user to be detected and then, its shape is converted into a dot pattern as data.

Further, data of the smart card 18 mounted to the PDA 13 is read out as the individual identification information as occasion demands. Thus, the individual identification information such as the fingerprint, pupil pattern, character pattern, and smart card data is input to the PDA 13 and converted into data (step 201).

Subsequently, the terminal ID code of the PDA 13 itself is read out (step 202) and is transferred along with the above-mentioned individual identification information to the center server 3 via the base apparatus 2 (step 203).

Then, at the center server 3, the fingerprint comparison/selection means 32 conducts pattern matching between fingerprint data thus transmitted as the individual identification information and pieces of the fingerprint data registered beforehand in the individual ID data file 31C (step 204). If a match is detected between the currently transmitted fingerprint data and any one of the pieces of fingerprint data registered beforehand, an individual ID code having the registered fingerprint data thus matched is specified (step 205). The table of correspondence between the individual ID code and the terminal ID code is created (step 206).

If a match was not detected at step 204, on the other hand, no individual ID code can be specified, thus making it impossible to obtain a specific service involving charging (step 207).

Also, at the center server 3, the pupil comparison/selection means 33 conducts pattern matching between pupil pattern data thus transferred as the individual identification information and pieces of the pupil pattern data registered beforehand in the individual IC data file 31C (step 204). If a match is detected between the currently transmitted fingerprint data and any one of the pieces of fingerprint data registered beforehand, an individual ID code having the matched pupil pattern data is specified (step 205), to create a table of correspondence between this individual ID code and this terminal ID code (step 206).

If a match is not detected at step 204, no individual ID code is specified, thus disabling a specific service involving charging from being received (step 207).

Also, at the center server 3, the character (signature) comparison/selection means 34 conducts pattern matching between character pattern data thus transferred as the individual identification information and the character pattern data registered in the individual ID data file 31C (step 204). If a match is detected between the currently transmitted character pattern data and any one of pieces of the character pattern data registered beforehand, an individual ID code having the matched character pattern data is specified (step 205), to create a table of correspondence between the individual ID code and the terminal ID code (step 206). If a match is not detected at step 204, no individual ID code can be specified, thus disabling a specific service involving charging from being received (step 207).

Also, at the center server 3, the smart card comparison/selection means 35 conducts matching between smart card data thus transmitted as the individual identification information and smart card data registered in the individual ID data file 31C (step 204). If a match is detected between the currently transmitted smart card data and any one of pieces of the smart card data registered beforehand, individual ID code having the matched smart card data is specified (step 205), to create a table of correspondence between the individual ID code and the terminal ID code (step 206). If a match is not detected at step 204, no individual smart card data can be specified, thus disabling a specific service involving charging from being received (step 207).

In this case, any one or a plurality of data items such as the fingerprint, the pupil pattern, the character pattern, and the smart card may be used. When as the individual identification information are used a plurality of data items of the fingerprint, the pupil pattern, the character pattern, and the smart card if any one of the data items matches, this is determined as being matched even if the remaining data items do not match so that this matched data can be used to specify an individual ID code.

Thus, the comparison/selection means 32, 33, 34, and 35 provided for the center server 3 compare individual identification information sent from the PDA 13 and acquired by the individual identification information acquisition means 21, 22, 16, and 18 to pieces of the individual identification data included in the individual ID data file 31C to then select such a data item of the individual identification data that matches the individual identification information among the pieces of individual identification data and to then specify the individual ID code, thereby allowing a user of the PDA 13 to be specified as an individual, thus enabling a plurality of persons to use one PDA 13. Moreover, since the individual ID data file 31C and the comparison/selection means 32, 33, 34, and 35 are provided on the side of the center server 3, the PDA 13 requires fewer processing functions, thereby enabling downsizing and saving power dissipation of the PDA 13.

When an individual ID code is specified, distribution service is provided for a relevant portable terminal apparatus 13 using the large-sized image display 5. The information related to a material being displayed on the large-sized image display 5 is read out of the image/voice/character information file 31A based on the identification information of the material added to the data. The base apparatus 2 wirelessly transmits to the PDA 13 the information and/or a list of information items which are/is obtained through the line from the center server 3 and also which correspond(s) to a material being displayed on the large-sized image display 5.

At the LCD unit 15 of the PDA 13 is displayed the list of the information received from the base apparatus 2, and then the user selects his/her desired information from the list displayed at the LCD unit 15 of the PDA 13. According to this selection of information, for example, a list of albums of a musician of a piece of music given in a large-sized image display is displayed at the PDA 13.

Then, if the user selects his favorite piece of music and wishes to download it, the relevant content information, that is, the selected piece of music is wirelessly downloaded from a content provider 37 through the center server 3 and the base apparatus 2 to the PDA 13.

Thus, if the user of PDA looks at a material currently displayed on the large-sized image display 5 and is interested in it, the user can access the various pieces of the information relevant to the displayed image with ease of operation, thus obtaining his desired information in some cases. This allows desired information to be obtained simply, rapidly, and accurately.

Also, downloading of music contents of five megabytes of data generally takes 10 minutes or more by telephone line. According to the invention, a service area is limited to the surrounding of the base apparatus 2 to enable a larger line capacity for each person to be maintained. The downloading of the music contents at a rate of 10 Mbps, for example, takes only four seconds, thus greatly reducing stresses on the user.

Next, the following charging system will be described with reference to FIG. 10. When the PDA 13 serving as the portable terminal apparatus enters a wireless service area of the base apparatus 2, the PDA 13 communicates with the base apparatus 2 to enter the standby state for data transmission and reception, as described above. Then, the PDA 13 transmits the individual identification information such as the fingerprint, pupil pattern, character pattern, and smart card to the center server 3 through the base apparatus 2. The center server 3 compares the individual identification information thus transmitted to pieces of the data in the individual ID data file 31C to determine an individual ID code of the user, thereby identifying the user and determining a subject to be charged.

As in the above-mentioned case, the user subsequently selects his favorite piece of music and, if he wants to download it, wirelessly does so from the base apparatus 2 to the PDA 13, upon completion of which fees of the contents are charged for the user based on the individual ID code. If the user's individual ID code cannot be specified, the subject to be charged cannot be specified, thus disabling the user to receive this service.

Figure 10:
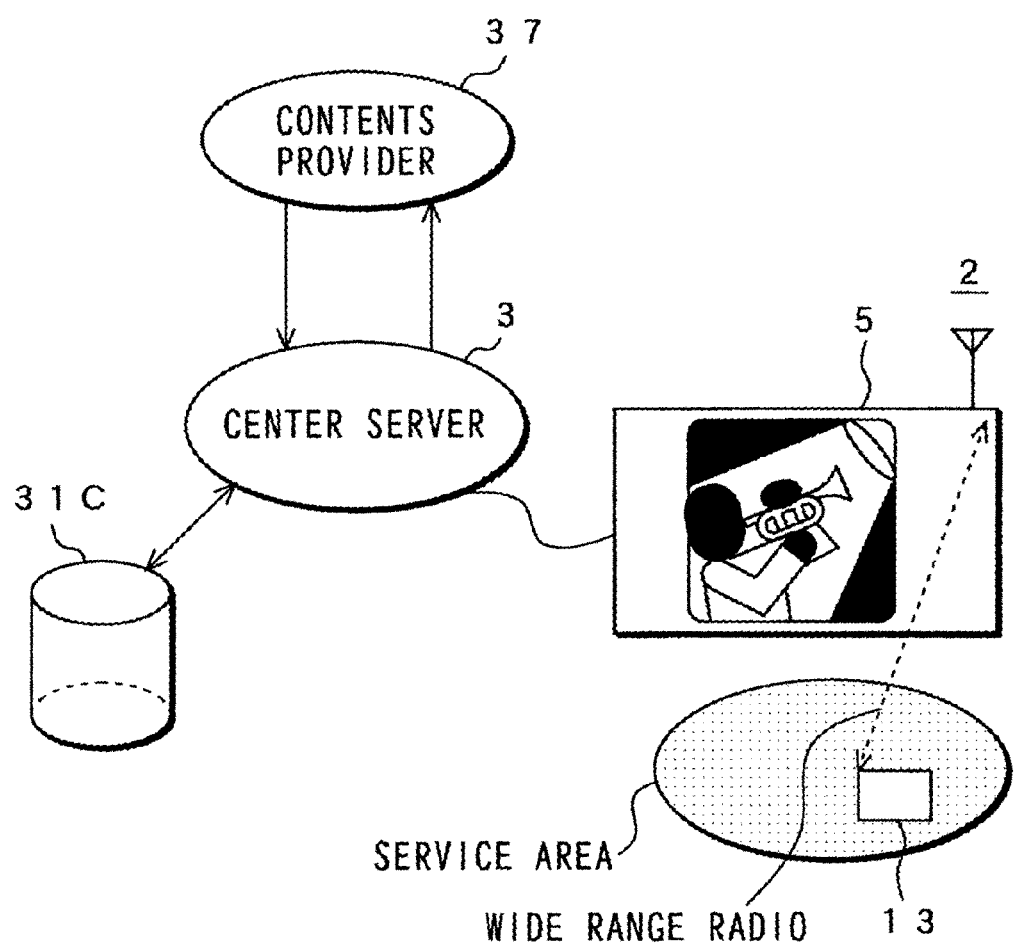
FIG. 10 is an illustration for explaining how to charge.

In contrast to a case of FIG. 10 where the user is charged as an individual by comparing the individual identification information to the pieces of data in the individual ID data file 31C, there may be such a case that the individual identification information and also the terminal ID of the PDA 13 are transmitted through the base apparatus 2 to the center server 3, which in turn compares thus transmitted terminal ID of the PDA 13 to the pieces of data in the terminal ID data file 31B to determine a terminal ID code, thereby charging the fees for that terminal apparatus based on that user's identification results. This approach is suitable for a case where a plurality of grouped individuals own the PDA 13 to receive the distribution service as a group.

Next, correlation between a cipher and an IC memory will be explained with reference to FIG. 11. Since the base apparatus 2 with a large-sized image display and the PDA 13 serving as a portable terminal apparatus communicate with each other wirelessly, data security is very important in communication between them. For the security, information encryption is available.

Figure 11:
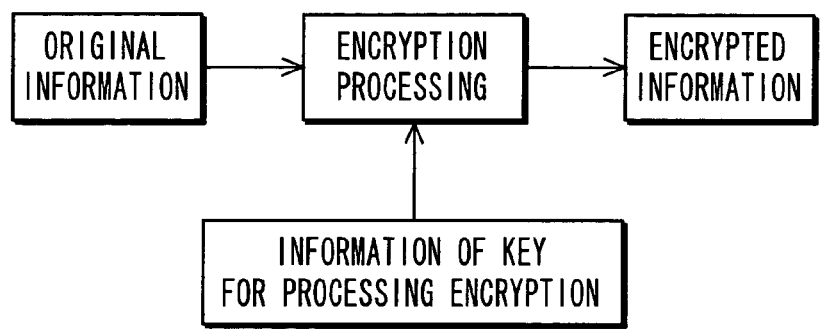
FIG. 11 is a diagram for explaining how to encipher information.
Figure 12:
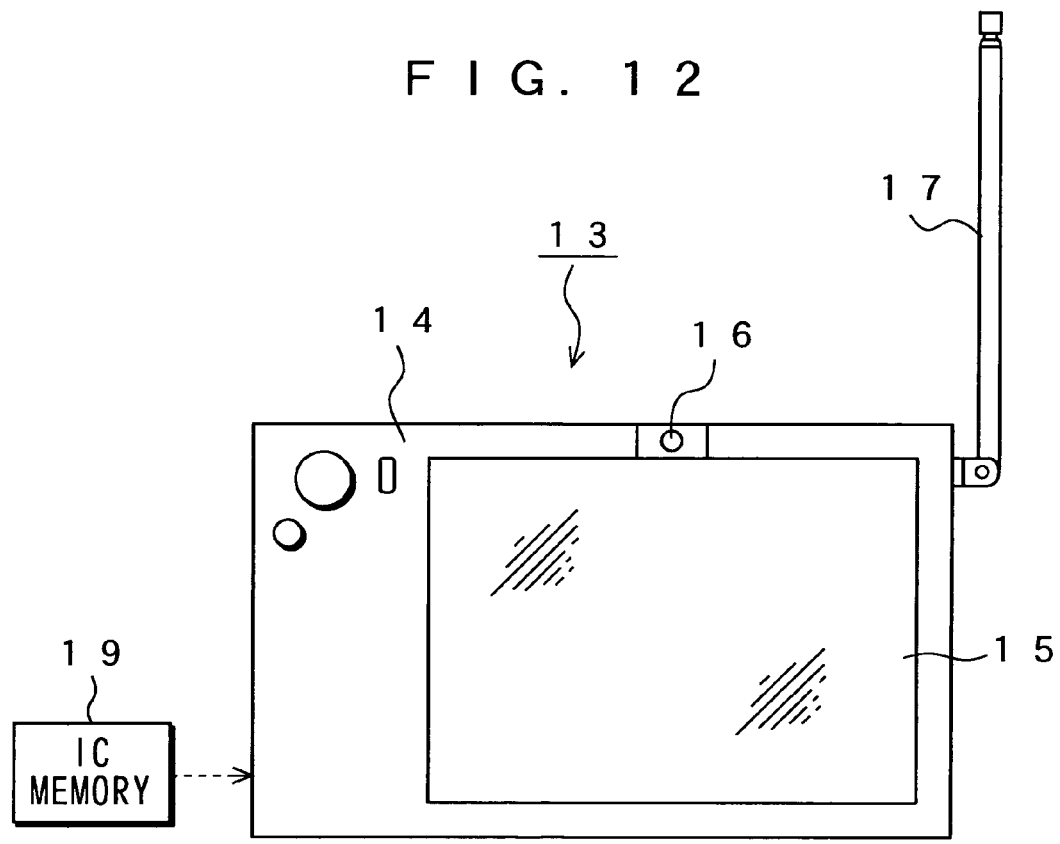
FIG. 12 is an illustration for explaining how to mount an IC memory storing information for an encipher processing key to a PDA.

At the PDA 13, original information not yet encrypted is encrypted into encrypted information using the central processing unit (CPU) or dedicated hardware, as shown in FIG. 11. Code data used in this encryption, for example, key information is supplied using the IC memory 19 to be mounted to the PDA 13 as shown in FIG. 12.

Assigning a key for processing the encryption to each individual beforehand allows the data to be decrypted only when an individual ID code determined by identification of an individual agrees with the key assigned to that individual, which is stored in the IC memory 19, thereby greatly improving the data security.

Figure 13:
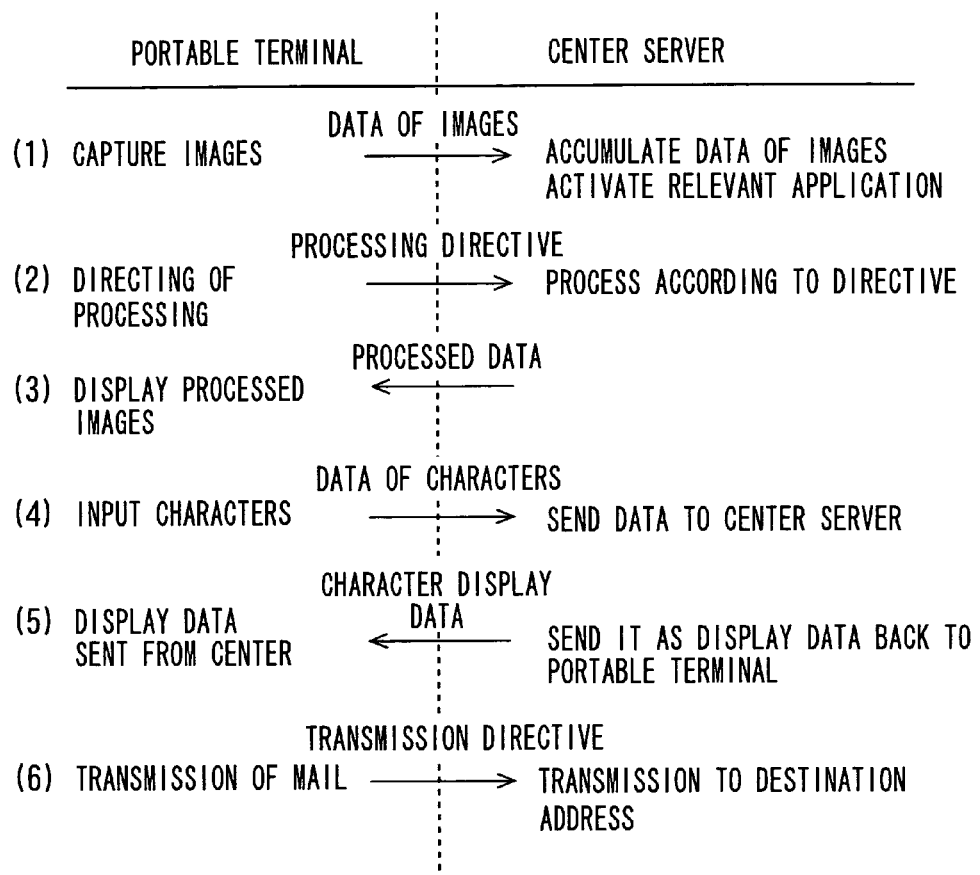
FIG. 13 is a diagram for explaining a processing function of the portable terminal apparatus.

The following will describe how to limit the processing functions of the PDA 13 serving as a portable terminal apparatus to a data input/output function to enable downsizing and saving power dissipation of the PDA 13 with reference to FIG. 13. Here, it will be described with reference to a case where images captured by, for example, the CCD camera 16 are processed and the ones thus processed are sent with them being attached to mail.

(1) The data of images captured by the CCD camera 16 provided as an accessory of the PDA 13 is taken into the PDA 13, accumulated in the temporary memory 25, and displayed at the LCD unit 15 as well as, at the same time, sent to the center server 3 and accumulated there. At the center server 3, an application required for processing the data of images is activated to wait for a directive from the PDA 13;

(2) A processing directive for the data of images is sent from the PDA 13 to the center server 3 where in turn the images are processed on the basis of that processing directive;

(3) The data of images thus processed is sent from the center server 3 to the PDA 13 and displayed on the LCD unit 15 thereof;

(4) At the PDA 13, a stylus, not shown, is used to enter mailing characters into the LCD unit 15, and the data of characters is immediately sent to the center server 3;

(5) The center server 3 processes the data of characters using mail software and sends it as necessary display data to the PDA 13 where it is displayed on the LCD unit 15 of the PDA 13; and (6) According to a mail transmission directive sent from the PDA 13, the center server 3 transmits this mail accompanied by an image file to a destination address.

Thus, the PDA 13 serving as the portable terminal apparatus performs only input/output processing, and specifically sends to the center server 3 the data required for processing to cause it to perform the processing on the side of center server 3, thereby eliminating a need to install various kinds of application software at the PDA 13. This decreases the required processing functions of the PDA 13 and reduces the power dissipation, thus enabling downsizing and saving power dissipation.

Although, in the above-mentioned embodiments, the terminal ID data file 31B, the individual ID data file 31C, and the comparison/selection means 32, 33, 34, and 35 are provided on the side of the center server 3, the invention is not limited to this; for example, the terminal ID data file 31B, the individual ID data file 31C, and the comparison/selection means 32, 33, 34, and 35 may be provided for the base apparatus 2.

Figure 14:
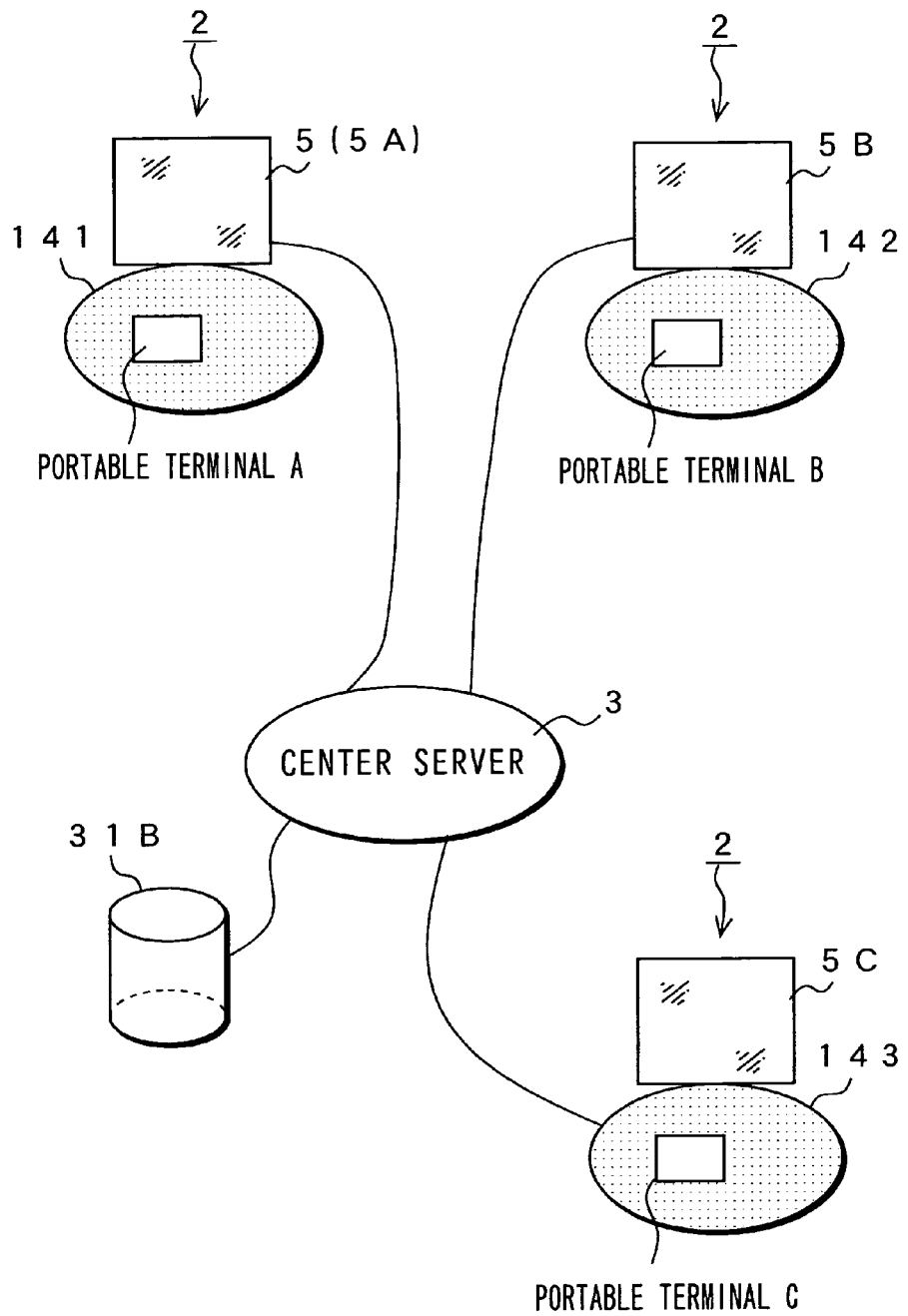
FIG. 14 is an illustration for explaining how to transfer data from a portable terminal apparatus to another portable terminal apparatus.

Also, it is preferable to provide such a system that enables mutual communication between the portable terminal apparatuses. FIG. 14 is an illustration for explaining data exchange between the portable terminal apparatuses. A general term of "portable terminal apparatus" is used in this explanation therefor.

When a portable terminal apparatus A in a service area 141 of a large-sized image display 5A sends a message to a portable terminal apparatus B at an unknown location, the message is once accumulated at the center server 3, so that such information that the portable terminal apparatus A currently exists in the service area 141 is accumulated in the terminal ID data file 31B of the center server 3. When the portable terminal apparatus B is newly registered in a service area 142, it receives notification of a fact that there is a message from the portable terminal apparatus A in the service area 141.

If the portable terminal apparatus B returns a message to the portable terminal apparatus A, that message is immediately transmitted via the center server 3 to the portable terminal apparatus A, thereby establishing communication between the portable terminal apparatuses A and B. Also, when both of the pieces of the portable terminal apparatuses A and B are in the same service area, they similarly communicate with each other via the center server 3.

When the portable terminal apparatus A in the service area 141 of the large-sized image display 5A sends a message to a portable terminal apparatus C at an unknown location, that message is once accumulated at the center server 3, so that such information that the portable terminal apparatus A currently exists in the service area 141 is accumulated in the terminal ID data file 31B of the center server 3.

When, in this situation, the portable terminal apparatus C is registered in a service area 143, it receives notification of a fact that there is a message from the portable terminal apparatus A in the service area 141. If the portable terminal apparatus C returns a message to the portable terminal apparatus A, that message is immediately transmitted via the center server 3 to the portable terminal apparatus A, thereby establishing mutual communication between the portable terminal apparatuses A and C.

Also, such a configuration may be employed that when information (individual ID code) related to individuals using the portable terminal apparatuses A, B, and C is specified on the basis of the individual ID data file 31C to then post a message, such information (individual ID code) that is related to the individuals using the portable terminals may be posted together.

Further, such another configuration may be provided that a portable terminal apparatus is specified on the basis of information (individual ID code) related to an individual and then a message may be sent to the portable terminal apparatus thus specified. Thus, by providing such a system that enables data exchange between the portable terminal apparatuses, they can be widely applied as a terminal not only for receiving distribution service but also for exchange of messages between individuals.

Although, in the above-mentioned embodiments, the PDA has been of such a type that enters information using a stylus into the LCD unit as a portable terminal apparatus, the invention is not limited to it; for example, the PDA may have a keyboard or may be another type of portable terminal apparatus capable of wireless communication.

Although, in the above-mentioned embodiments, the CCD camera 16 has been attached to the PDA 13, the invention is not limited to it; for example, of course the PDA 13 may not be provided with the CCD camera 16 as an accessory. Although, in the above-mentioned embodiments, the fingerprint identification sensor 32 has been used to read out a fingerprint of the thumb, the invention is not limited to it; for example, the fingerprint of any other fingers, e.g., the second or third finger or even a plurality of these fingers may be read out.

As described above, in the distributing system of the invention, the base apparatus or the central processing station compares the individual identification information sent from the portable terminal apparatus and acquired by the individual identification information acquisition means to pieces of the individual identification data stored in the storage means, thereby selecting such data among the pieces of the individual identification data that matches the individual identification information in order to specify an individual identification code, so that when the comparison/selection means could specify the individual identification code, the portable terminal apparatus can obtain information from the base apparatus to identify an individual using the portable terminal apparatus, thereby preventing unauthorized use by the third party and also enabling plural persons to use one portable terminal apparatus. Moreover, since the storage means and the comparison/selection means are provided for the base apparatus or the central processing station, the portable terminal apparatus needs to have fewer processing functions, thus enabling downsizing and saving power dissipation of the portable terminal apparatus.

The portable terminal apparatus performs input/output processing of the data of the character and images and the central controller processes the data of the character and images, thereby reducing the required processing functions of the portable terminal apparatus, and further downsizing and saving power dissipation of the portable terminal apparatus.

According to the above-mentioned embodiments, for purpose of illustration, the information stored in the base apparatus has been distributed to the large-scaled image display through the communication between the PDA serving as the portable terminal apparatus and the single base apparatus (base station) or the center connected with the base stations.

The following will describe a distributing method and a distributing system that are capable of distributing to the base apparatus or the large-sized image display as necessary from the center (Central Processing Station) information common to plural persons (hereinafter referred to as "participants") who respectively own the portable terminal apparatus and stay in an area where it may communicate with the base apparatus, the information being required to enhance a community, in order to share information with the participants and support a sort of formation of the community through an exchange, a share or the like of information.

The participants generally consists of an unspecified third party in this instance to cause the persons who are extraneous to a territorial society and blood relation to form the community, thereby allowing them to have purposes of sharing available time and space required to form the community and making available of shared environment of information. When the participation to a meeting place for community is acknowledged, inherent information of the participants or the like is distributed to the other, thereby allowing the participants to grow their solidarity or agreement resulting from the shared information.

In order to form such the community, information storage means arranged in the base apparatus 2 or the center 100 stores information (hereinafter referred to as "profile") for illustrating each of the participants beforehand. Due to the embodiment of the distributing system according the invention as shown in FIG. 15, profile information storage means 31D storing the profile information of each of the participants is newly provided at a side of the center 100. The profile information includes the profile information of the participants who not only have already participated in the community but also previously want to participate in a community having such a form and is stored. In a configuration as shown in FIG. 15, like reference numbers are attached to the parts corresponding to the ones shown in FIG. 7, eliminating the explanation thereof.

Suppose that distributive information storage means 31A stores fixed introduction information, namely announcement information to be used when distributing the profile information, in addition to the distributive information, which will be described later.

FIG. 16 shows an example of the profile information of the participants. Regarding the profile information, it is necessary to take privacy into consideration because the profile information is individual information. According to the embodiment, multiple levels of information disclosure are set so that only the profile information with the disclosure level accepted by the participant may be distributed.

Each of the disclosure levels may be set to multiple layers. The participant may indicate the disclosure levels as necessitated. The participant may set the disclosure levels to disclose only the noncommittal profile information at first.

FIG. 16 shows the individual information but an example of the noncommittal profile information when disclosing it to the participants, that is the profile information relating to a low level of privacy. Thus, FIG. 16 shows the disclosure information with enjoying general popularity. An arrangement of items of the profile, a number of items thereof, content of the items thereof, and the like are merely illustrated as an example.

Figure 17:
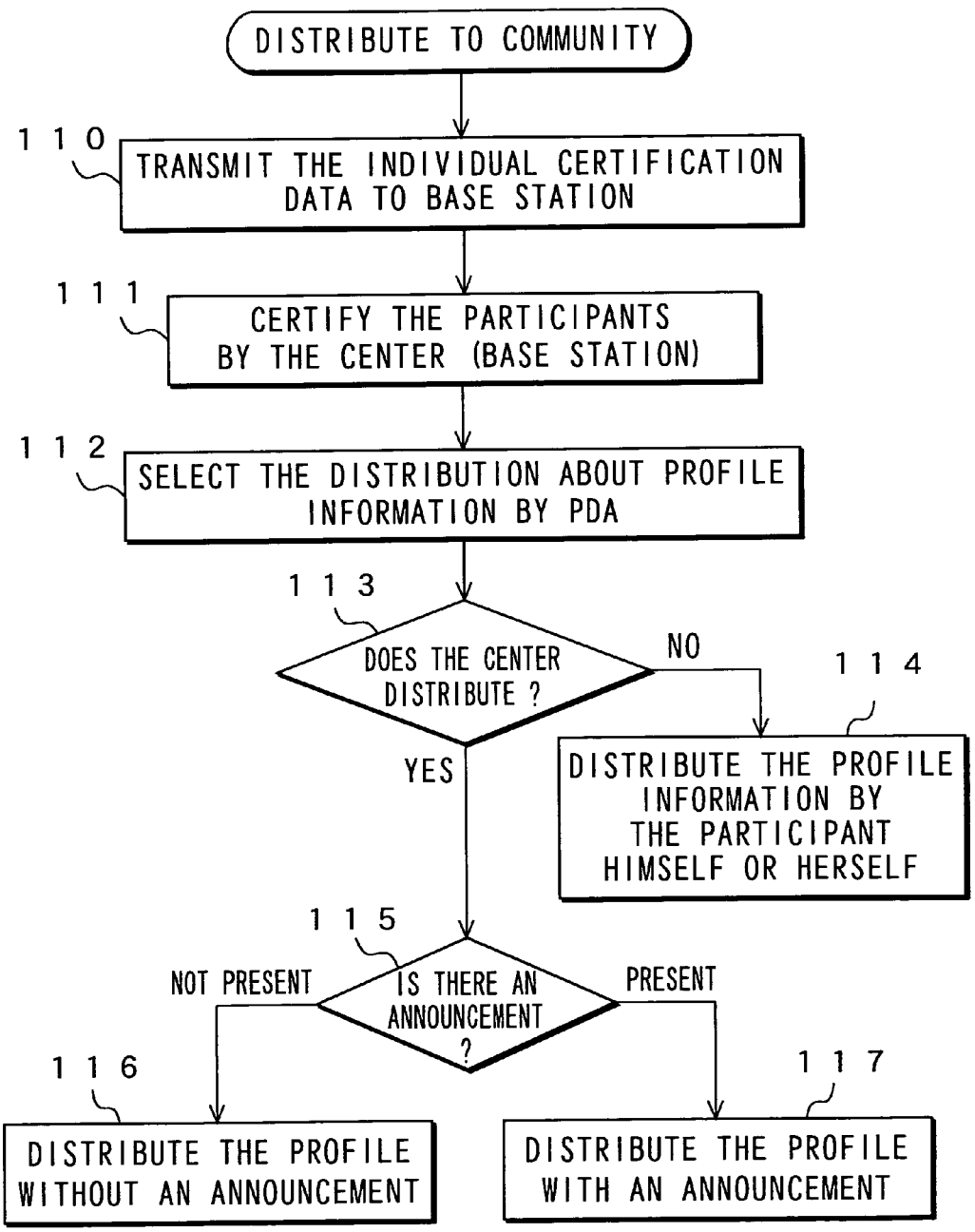
FIG. 17 is a flowchart for showing an example of distributing procedure of the profile information to participant(s)

FIG. 17 is a flowchart for showing an embodiment of processing procedures for implementing a distributing method of the information to be used when forming such the community. For convenience of explanation, this flowchart illustrates the processing procedures of both sides of the participant and the base apparatus 2 (and the center 100) with them being gathered together.

When a participant enters into a meeting place for an event (for a community) in which a specific base apparatus is installed, the participant transmits individual certification data to the base apparatus 2 using his or her own portable terminal apparatus 13. Alternatively, he or she automatically transmits the individual certification data from his or her own PDA (Step 110). When a side of the center 100 receives the individual certification data through the base apparatus, the data is referred to individual-certification-data storage means (certification database) 31C installed in a side of the center 100 and checked if the participant has been already registered so that if he or she has already registered therein, the center certifies him or her and sends back the information that he or she is an eligible user (Step 111).

Next, the participant transmits information (profile distribution control data) for indicating his or her own disclosure level of profile information and the distributing method (Step 112). Due to the data, some control is performed to select any one of automatic distribution mode and introduction distribution mode, which will be described later, to set a disclosure level of the profile information to be distributed to fix the extent thereof, or to distribute profile information the participant has most newly made, using his or her own portable terminal apparatus (self-distribution).

At a side of the center 100, this distribution control data is analyzed (Step 113). When self-distribution mode is selected, the side of the center 100 takes no part therein and waits for the participant to process the distribution by himself or herself (Step 114).

When no self-distribution mode is selected, the distribution is performed under the control of the center, and then an embodiment of distributing method (with or without announcement) is determined (Step 115). If without announcement, the profile information of instructed disclosure level is distributed to the participants without announcement for introduction (Step 116). In a state thereof, if no instruction to the disclosure level of profile information is set, the most popular profile information is set to be disclosed by default.

If the distribution with announcement, the announcement information for introduction is read out of, for example, the distributive information storage means 31A and distributed to all the participants, as well as the profile information is distributed according to the instructed disclosure level of information with a time lag to a limited extent (Step 117). If no instruction to the disclosure level of profile information is set in this introduction distribution mode, the most popular profile information is also set to be disclosed by default.

The introduction distribution mode is a mode that the side of the center 100 has distributed the announcement information given beforehand (the announcement information for introduction such that the profile for person of this kind is distributed in future) before it distributes the profile information of this individual. The selection of this mode allows persons who stay in the meeting place to accept the convenience such that they are previously aware what kind of the next information is distributed. In this introduction distribution mode, the disclosure levels (three levels in this case) of the profile information are also set beforehand. Alternatively, a living person who stays in the center may provide the announcement.

In these operations, a situation of a side of the PDA 13 will be explained.

Figures 18, 19:
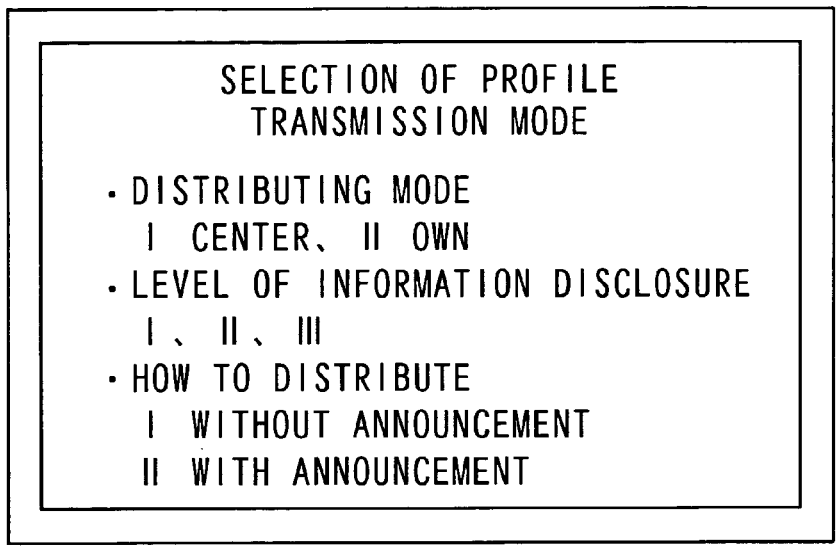
FIG. 18 is a diagram for showing an example of a menu for setting a transmission mode of the profile information.
FIG. 19 is an illustration for showing an example of table from which common matter(s) of concern and interest can be extracted.

FIG. 18 shows an example of a menu for setting a transmission mode in the LCD unit 15 at a side of the participants (see FIG. 4). In this example, the participant himself or herself has rights of the level setting of the profile information and the selection of the distribution method used in the steps 113, 115 and later steps shown in FIG. 17. The participant transmits information (distributive control data for the profile) for indicating the disclosure level of his or her own profile information and the distribution method (see Step 112 in FIG. 17).

Under the distributive control data, are performed various control such as the selection between the automatic distribution mode and the introduction distribution mode, which have been described, setting of disclosure levels of the profile information to be distributed, or the distribution (self-distribution) of the newest profile information made by the participant using his or her information terminal apparatus.

FIG. 18 shows an example of the instruction method for a disclosure level of information. This figure illustrates a case where three disclosure levels thereof such as general profile information (a first disclosure level 1), and profile information in which the individual's right to privacy is respected in sequence (second and third disclosure levels 2, 3) are set. Thus, supposing that as a premise, the participants previously provide information on their respective disclosure levels, and the profile information storage means 31D implemented in a side of the center 100 stores the profile information in addition to this disclosure level information.

The above setting is performed using LCD unit 15 of the portable terminal apparatus 13. Therefore, the microprocessor-equipped controller in the portable terminal apparatus 13 performs the information processing and the transmit/receive processing based on a reply from each of the participants, which has been described.

Thus, the distribution system in which the distribution of profile by the participants can be supported allows the profile information submitted to wishes of the respective participants to be easily share with all the remaining participants. This causes the participants to be known to each other so that a sense of participation to a community can be enhanced, and senses of unity and solidarity can be grown. The above is the description of the system for supporting mutual understanding of the participants that is the first step of the formation of community.

After completion of an exchange of the profile information by the participants, their mutual understanding allows for loose formation of community. The following will be the description of distribution system that supports selection of themes for exchanging the information among the participants.

To begin with, the following will be of the description of an example for exacting the themes from the profile information of the participants. The selection of participants who participate in the particular meeting place allows a side of the center 100 side to list the profile information of all the participants and make it suitable for being arranged in a table form. FIG. 19 shows an example of such the table wherein a total of 16 members starting from the participant "A" to the participant "P" participate in the community and 10 items of the profile information are listed. An indication of a concrete example of the profile information is omitted.

Making the profile information suitable for being arranged in a table form allows group properties of the participants who participate in this case to be appeared in the table. According to this, the following will be of the description of the distribution system for automatically presenting the themes that are most suitable for each of the group properties.

Next, the items are selected from this table.

Supposing that the participants are classified under eight sets according to 10 years of age from one's teens to eighties against the item of profile information when an unclear tendency for the group properties is shown on the item. If two participates are classified in each set, the every set of age includes same number of participants. They are divided in two groups according to an adult and a minor so that teens of two participants and the adults of 16 participants can be shown, thereby developing a clear tendency. Namely, such grouping of items similar to the contents according to the upper concept allows the classification thereof to be achieved.

If the profile information is not fixed like the age composition, it is conceivable that this method would be applied to a case where the profile information is constructed according to various ways of description under free will of the individual.

When item of foods is illustrated, it may be described as a concept such as Japanese foods, Western-style foods, and Chinese foods, as a liking for an egg dish in even the Western-style foods, or as a concrete name of the dish such as fried eggs and an omelet. Further, in the Western-style foods, it may be described as a liking for a beefsteak or spaghetti.

Thus, based on the information, a grouping operation is performed according to common concept. A representative concept that is an upper concept on the common items is set with the grouping being executed according to enlarged common concept. If plural representative concepts exist, weights are assigned because a number of the participants vary according to each of the items thus grouped under the representative concepts.

One of the ways to assign weights may be illustrated as a number of the participants belonging to each of the grouped items. As a result of the grouping, if same number or so of the participants are illustrated, an item is omitted from elements for theme selection because no clear tendency to the item is shown in the grouped participants.

For example, selection of the items each showing two third or more in the entire of participants relative to an evaluation of the theme selection allows for the selection of the themes suitable for the groped participants from a profile table for the groups. It is appropriate to suitably vary numerical values about the theme selection such as the following numerical values in case of automatic theme selection by means of measurement of activation in the grouped participants:

(1) A coefficient of weight; and
(2) A value of criteria for evaluation.

For example, regarding the above coefficient of weight, age composition is stored as data presenting not so strong impact, so that weight of the item of age composition for the selection of themes can be lightened. Therefore, the coefficient of weight for the selection of themes is obtained by calculation of (a number of participants belonging to the item)*(the coefficient of weight for the item).

Next, the above criteria for evaluation are criterion measures for deciding whether or not an item should be selected if the item indicates some tendency, which indicate biased sub-items in the item. Regarding sex, for example, if data in the past indicates that the selection of the theme suitable for woman is not required when man and woman present a ratio of 4:6 but the selection thereof is required when they present a ratio of 2:8, the criterion measure for evaluation should be suitably selected as a ratio of 3:7.

An arrangement of the selected items allows characters of group of the participants who participate in the meeting place for community to be found. Such a tendency that man of forties or higher likes Japanese foods, warm colors, actresses known as having her looks more than her performance may be illustratively grasped.

Further, when each of the participants registers his or her profile information if limiting the input information to the common concepts, the common concept may be selectively input from these items of common concepts.

Next, the themes having a profound influence on the selected item are retrieved and collected. The materials, for example, relative to the theme of Japanese foods are retrieved. The themes are retrieved using database of the distributive information storage means 31A implemented in the center 100 or the Internet 101 connected to the center 100 (see FIG. 15). In other words, the materials relative thereto are collected with retrieving the web sites connected with the Internet 101 and referring the corresponding database.

Image information (moving image and still image), data, and the like, which have the most profound influence on the theme, are set out of the collected materials as distributive information. Since the data set has a large amount of information, the information (summary) indicating an outline thereof is distributed to the portable terminal apparatus 13 as a theme selection menu screen (summary screen). At the same time, it may be also distributed to and displayed on the large-sized image display 5. The participants select the future theme from the summary screen on which it is distributed. When a side of the center 100 affirms that the theme is selected, out of the data set, the materials relative thereto are sequentially distributed to the portable terminal apparatus 13 or the large-sized image display 5 as necessary. The above processing allows the center to select the theme and submit a proposal to the participants based on their profiles.

Figure 20:
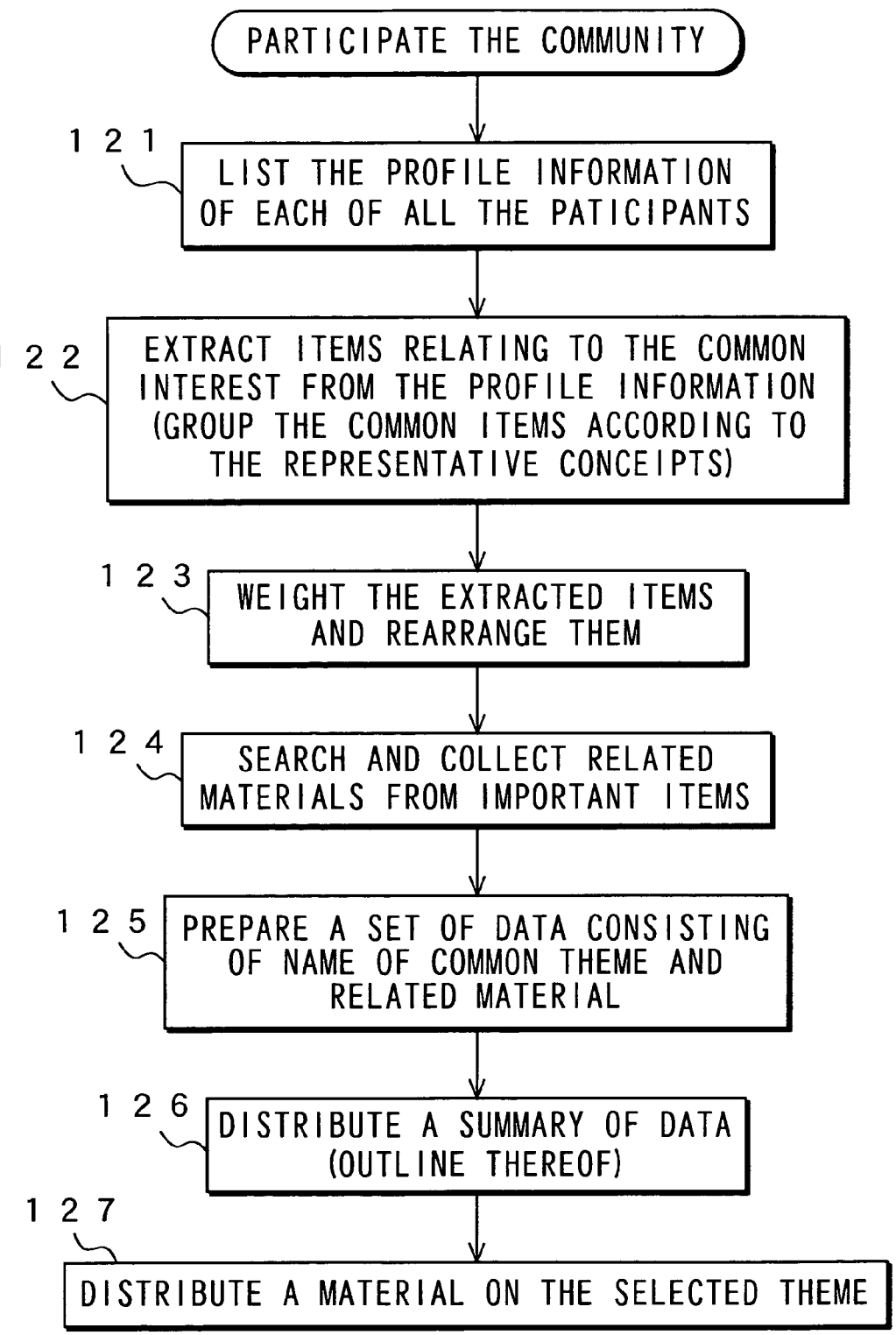
FIG. 20 is a flowchart for showing an example of distribution procedure of theme.

In order to implement the above processing, the following distribution processing will be performed at a side of the center 100 according to the procedures as shown in FIG. 20. The profile information of each of the participants in the meeting place for community is first listed to make a table on the profile information (Step 121). Next, items relating to the common interest are extracted from the profile information thus arranged as a table using, for example, the representative concepts thereof (Step 122). The representative concepts thus extracted are weighted so that the weighted representative concepts having the largest numerical value are tied with each other and grouped (Step 123). Materials relative thereto are retrieved and collected from the items included in the group having the largest numerical value (Step 124).

Information (image and the like) relating to the common items is set as materials to be distributed (Step 125), and a menu (summary) for easily displaying the set materials relative thereto is formed and then it is distributed to the participants (Step 126), thus allowing the participants to decide the common items (themes) to be distributed on his or her own initiative.

Taking it into consideration that plural participants may access the center 100 at the same time when deciding the themes, it is just conceivable that various ways such that the participant who first access the center can be authorized to select the theme, or the most common theme that the plural participants select can be determined might resolve this problem. It is the easiest way that the first accessed participant is authorized to select the theme.

An intention (theme selection information) of each of the participants is made as a total and the center 100 distributes it from the portable terminal apparatus 13 so that the related information (image, audio, data, or the like) thus selected is successively distributed to the participants and the large-sized image display (Step 127).

Such the distribution processing causes the participants who participate in the meeting place for community to enhance his or her own consciousness of participation in the meeting place for community because according to the distributing system, the participants are capable of selecting the common themes by himself or herself, thereby allowing construction of an interactive distributing system such that the participants can exchange the information for another with them being communicating with each other.

Further, referring to FIGS. 20 and 21, the following will be described on the selection of common theme when the profile information of an individual is made according to the limited input individual information following a fixed pattern. For the convenience of explanation, suppose that when a total of eight items of the profile is set, the profile information of all the participants is listed so that the listed items shown in FIG. 21 can be given (Step 121 in FIG. 20).

Each of the units showing complete data of profile information of the participants as shown in FIG. 21 lists the profile information in decreasing order of a number of the participants belonging thereto every item according to the complete data of the selected items (common items). A coefficient of weight in the unit indicating the most participants is shown by % and the items rank in decreasing order of the coefficient of weight.

In this case, only the common items having the coefficient of weight more than 50% are subject to search of the materials relative thereto (Steps 122 and 123 in FIG. 20). As a result thereof, the items numbered one, three, and six are limited as retrieving subject (These items are rigidly listed for illustrative purpose).

Results of retrieving the materials relative to the items numbered one, three, and six are shown as a number of retrieved materials (Step 124 in FIG. 124). If all the retrieved materials are set as the materials relative thereto, they have too enormous amount of information. Taking this into consideration, disclosure layers regarding the materials relative thereto are set as shown in FIG. 22.

A first layer of disclosure includes a total number of the materials in each of the items numbered one, three, and six. A second layer includes a total number of the materials in case of AND between two of these three items. A third layer includes a total number of the materials in case of AND among all the items.

Figures 22, 23:
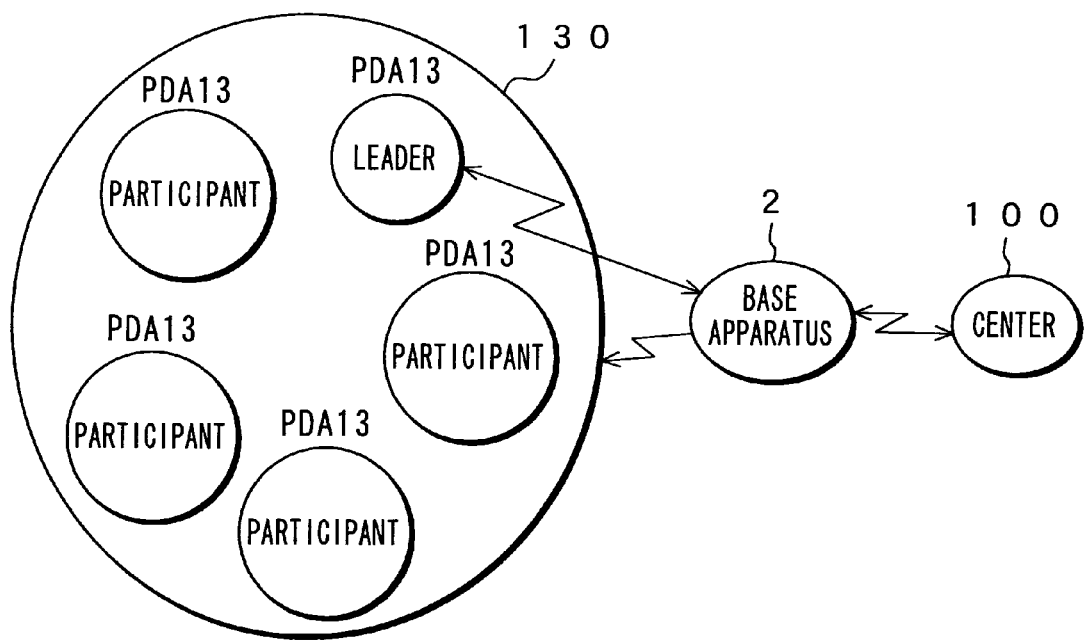
FIG. 22 is a diagram illustrating an example of disclosed layers of related materials.
FIG. 23 is a diagram for showing an example of a salon-styled distributing system.

According to a case shown in FIGS. 21 and 22, four materials relative thereto to be disclosed (to be first distributed) are hit from this resulted total as the common theme to be distributed, in other words, the common theme that most of the participants share because the third layer is suitable therefor (Step 125 in FIG. 20). Thus, a summary of these four materials, for example, a summary using common item as shown in FIG. 21 is made so that it can be distributed to the PDA 13 that the each of the participants holds and/or the large-sized image display 5 (Steps 126 and 127 in FIG. 20). Note that the coefficient of weight subjected to the retrieval or the like may be arbitrarily set.

Further, it is possible to retrieve and collect the materials based on the concept for grouping described above. When the items numbered four through eight are illustratively selected as the common items, arrangement processing is performed so that the items having the greatest number of the participants in each of the common items may be grouped as a first group, and the items having the next lower number of the participants in each of the common items may be grouped as a second group. The materials are then retrieved and collected starting at the first group. The disclosure layers relative to the materials can be set with referring to, for example, the coefficient of weight.

Although the distributing system such that the common theme may be automatically selected at a side of the center 100 and presented to the participants has been described in the above embodiments, any theme may be raised in the meeting place for community and then the matters relating to common interest which are distributed with any one of the themes being weighted may be extracted. The following will be described on a concrete case thereof. This may be regarded as a distributing system like a salon form because the participants can interact with each other with raising the themes.

In order to form the salon, any meting place for community including the plural participants is set as a salon 130, shown in FIG. 23, in which the one is selected as a leader from the participants. The leader is authorized to select the themes. Thus, only the leader holds a selection right to the center 100 for being illustratively authorized to display an image on the large-sized image display 5.

Figure 24:
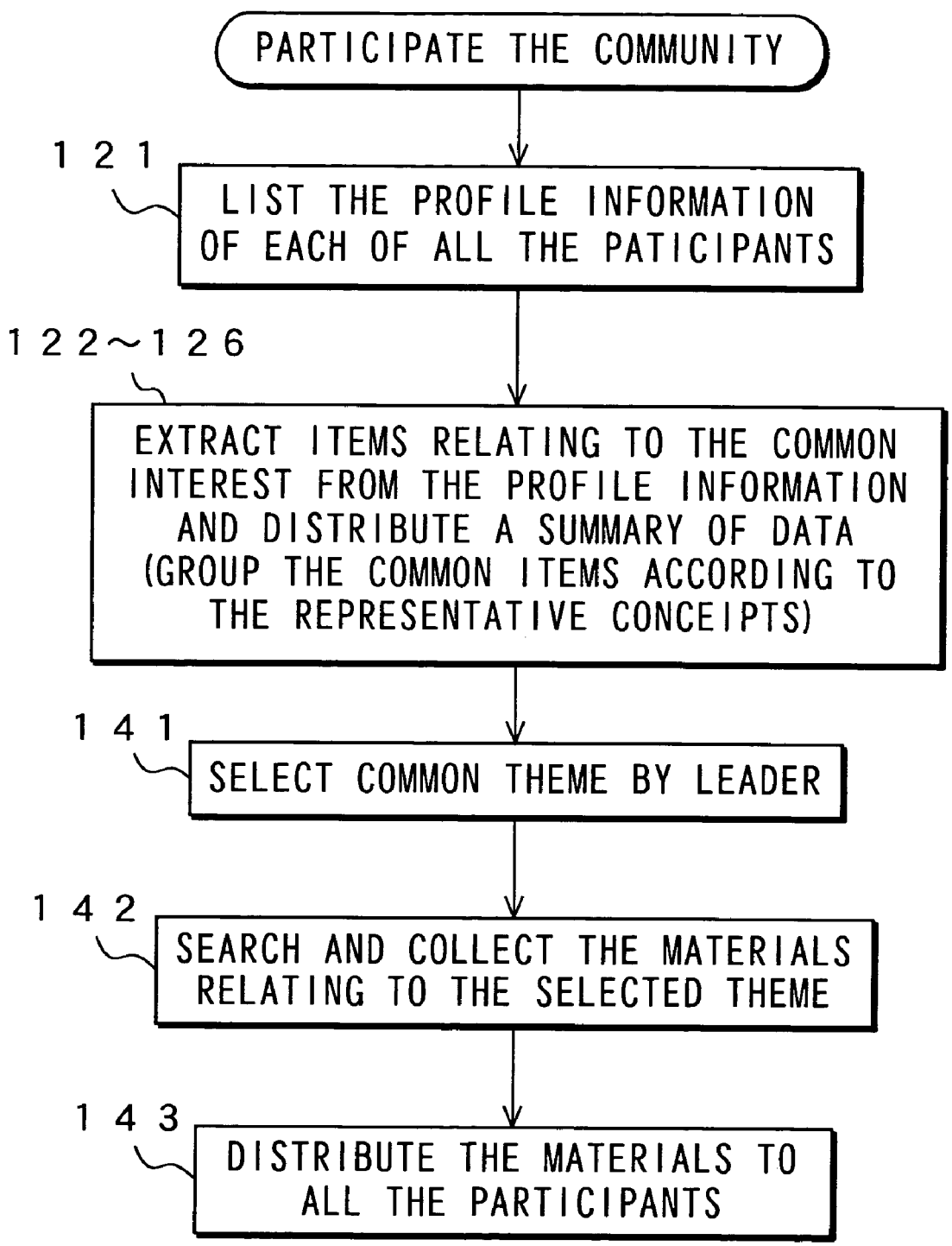
FIG. 24 is a flowchart for showing an example of a salon-styled distributing method.

The distributive orders therefor are shown in FIG. 24. Similar to the description relating to FIG. 16, the matters relating to common interest that are made and extracted with referring to the profile information of participants are grouped, and then a summary of data set for them is distributed to all the participants (Steps 121 through 126). The leader selects the themes that are suitable to a use in the salon, from the distributed summary (Step 141). At the center 100, the materials relative to the selected themes are distributed to the large-sized display 5 and/or the portable terminal apparatus 13, which display them (Steps 142 and 143).

When topics about the themes are presented, the participants may distribute them to the respective other participants through the portable terminal apparatus 13. The leader selects all of them finely. Thus, the selection of leader allows the participants to share the information through an interactive communication with the center 100.

Figure 25:
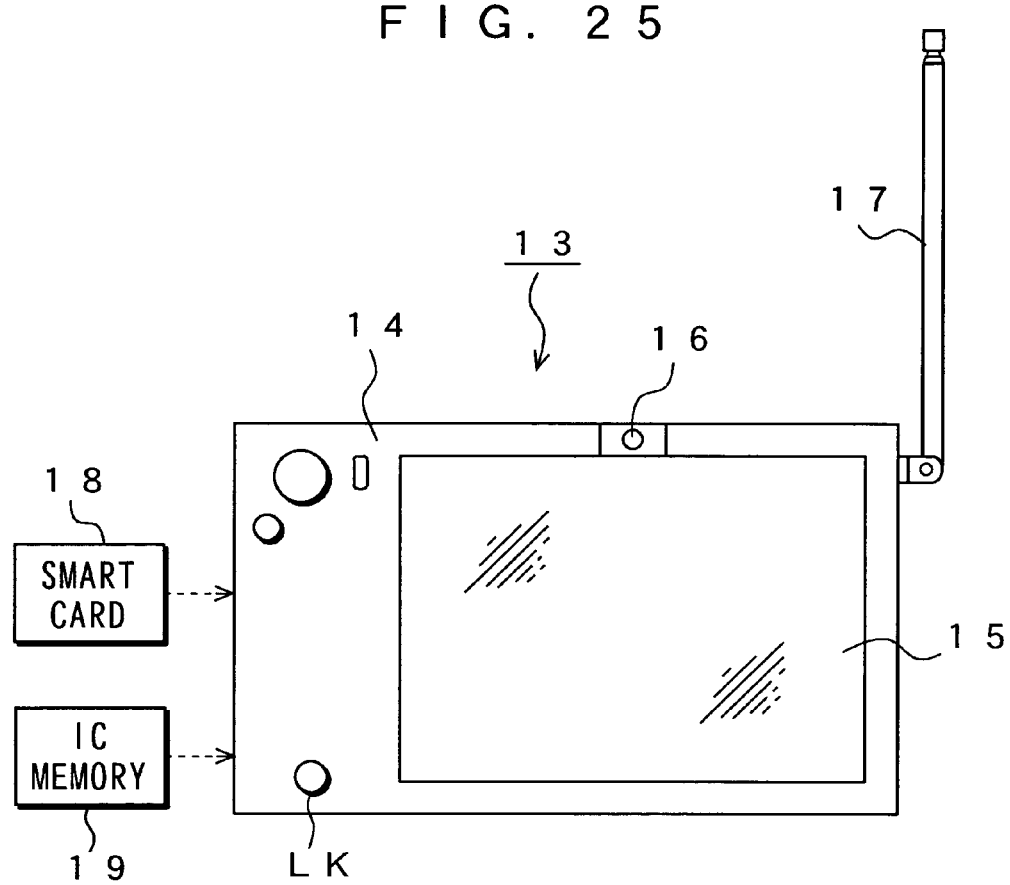
FIG. 25 is an external view of a PDA on which a leader key is arranged.
Figure 26:
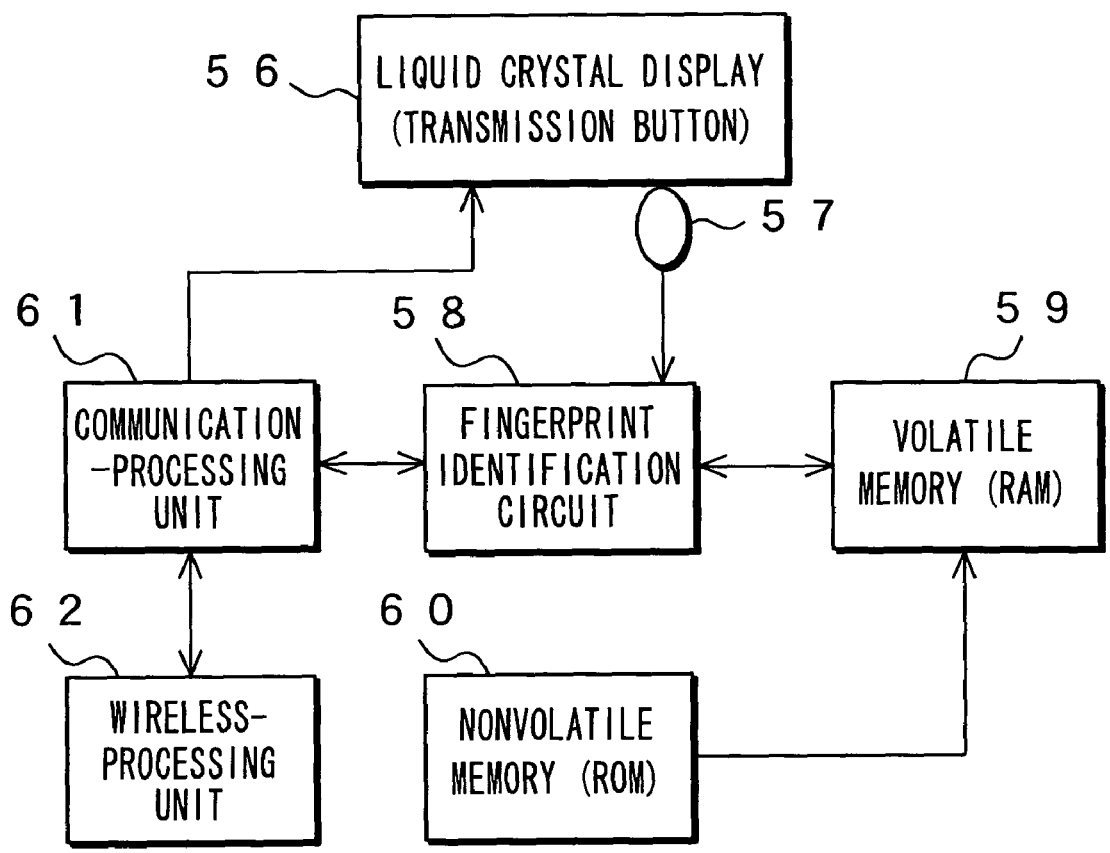
FIG. 26 is a block diagram for showing a prior art mobile communication portable terminal apparatus.

FIG. 25 shows an embodiment of the portable terminal apparatus 13 to be used therefor. In the embodiment, a leader key LK is provided with a part of portable terminal apparatus 13. When pushing the leader key LK after the participants have selected the meeting place for community to be the salon form, the information showing that the leader key LK has operated is transmitted to a side of the center 100 through the base apparatus. This allows the center 100 to be arranged to be received the instruction from only the leader key LK. The processed information is then distributed to the large-sized image display 5 in addition to the participants. A release of the leader key LK permits the distribution of data to be returned to a normal distribution.

Although it has been described in the above embodiment that the profile information storage means is positioned at a side of the center 100, it goes without saying that storage means for storing this profile information, distributive information, terminal information, individual identification data or the like may be positioned at sides of respective base apparatuses, thereby allowing the distributing system or the like to be so constructed that the above communication and distribution can be performed only between the portable terminal apparatus and the base apparatus.

In this case, any means such as storage means for storing the profile information and storage means for the announcement information, that may process the contents similar to the one processed at a side of the center 100, is positioned at a side of the base apparatus, which will omit the detailed description thereof.

Although the distributing system and the like such that a community can be formed by holders of the portable terminal apparatus who stay in an area that particular base apparatus may cover, the holders consisting of the participants, and the participants can communicate the base apparatuses or the center to distribute the specified information has been described, it is possible to communicate the communities with each other, each community formed in the respective areas of plural base apparatus connected with the center, and exchange or distribute the above information using the plural base apparatuses connected with each other and the large-sized image displays provided with them.

Resulted communication between the participants allows for a decision of common themes, thereby enhancing the community consisting of the participants based on the presented common subject. Various theme selections are conceivable such that the themes may be previously selected and prepared at a side of the center 100, extracted from the profile information of the participants, or selected by the participants themselves.

Thus, the items are grouped in considerable tendency order (as the representative concept). Since a number of the participants on each of the grouped items indicate the above considerable tendency, the grouped items are illustratively weighted with the number of the participants. After weighting, the grouping are sequentially performed such that plural representative concepts each having the greatest number of the participants can be initially formed as first group, and representative concepts each having the next lower number of the participants can be formed as second group. Such the grouping permits these groups to be used as criteria for selecting next common theme.

INDUSTRIAL APPLICABILITY

Distributing system and distributing method according to the invention are applicable to distributing system and distributing method such that large-sized image display, base apparatus and the like can be positioned at the places connected via the network, thereby allowing the image given by another base apparatus to be displayed, the information (advertisement image or the like) received from the central processing apparatus to be distributed to the portable terminal apparatus within a service area of the base apparatus, the profile information of users of portable terminal apparatus stayed in the service area to be distributed to other users, the users stayed in the service area to be communicated with each other, the users (participants) stayed in each of the service areas to be communicated with each other if single area or multiple service areas is/are used as single or multiple meeting place for community.

The invention claimed is:

1. A distributing system comprising:
a plurality of base apparatuses each having an image display device and performing wireless communication including data transmission;
a central processing station including distributive information storage device for storing a first informational data and a second informational data to be distributed and individual identification data storage device for storing pieces of individual identification data, said central processing station being connected with each of said plurality of base apparatuses through a communication line to distribute said first and second informational data to each of said base apparatuses, each of the base apparatuses having a predetermined wireless service area; and
a portable terminal apparatus including individual identification information acquiring device for acquiring a user's individual identification information and device for transmitting to said base apparatuses the individual identification information acquired by said individual identification information acquiring device, wherein said portable terminal apparatus is for performing wireless communication with the base apparatuses, said communication including reception of said second informational data obtained from said central processing station through the communication line, wherein the portable terminal apparatus includes device for determining whether the portable terminal apparatus is located within the wireless service area corresponding to one of the plurality of base apparatuses and, based on the determined wireless service area, performing wireless communication with the corresponding base apparatus,
wherein said central processing station includes central control device for allowing said individual identification information to be transmitted from said portable terminal apparatus to said base apparatus, said individual identification information being received through said communication line to be compared to said pieces of individual identification data stored in said individual identification data storage device; and
wherein said central control device allows second informational data to be distributed to said base apparatuses for transmitting said second informational data to said portable terminal apparatus when any one of said specified pieces of individual identification data matches said individual identification information, said second informational data corresponds to the first informational data being displayed on said image display device, and said second informational data is different from the first informational data being displayed on said image display device,
wherein said central processing station includes information processing device for listing profile information of all participating portable terminal apparatuses of a meeting place, extracting a plurality of frequently occurring common items, weighting the common items, retrieving and collecting material related to the weighted common items, and transmitting a summary of the collected material to said base apparatuses for distributing said summary to everyone of the participating portable terminal apparatuses and for displaying the summary on said image display device.

2. The distributing system according to claim 1, wherein said individual identification data storage device stores a plurality of pieces of said individual identification data each corresponding to an individual identification code that are assigned to every individual; and
wherein said central control device allows for comparing said individual identification information transmitted from said portable terminal apparatus to said base apparatus and sent through said communication line to said pieces of individual identification data stored in said individual identification data storage device; and
wherein when any one said plurality of pieces of individual identification data matching said individual identification information is selected to specify said individual identification code, said central control device allows for distributing said second informational data to each of said base apparatuses to transmit the data to said portable terminal apparatus.

3. The distributing system according to claim 2, wherein when said portable terminal apparatus acquires said second informational data in communication with one of said base apparatuses or said portable terminal apparatus transmits a request for said second informational data, said user of said portable terminal apparatus is charged based on said individual identification code of said user.

4. The distributing system according to claim 1, wherein said central processing station includes terminal information storage device for storing a piece of identification data for said portable terminal apparatus;
wherein said portable terminal apparatus transmits said individual identification information and inherent terminal identification information to said base apparatuses;
wherein said central processing station receives said inherent terminal identification information with positional information of the base apparatus corresponding to the service area in which said portable terminal apparatus is located, and said terminal information storage device stores the inherent terminal identification information and the positional information of said base apparatuses; and wherein said central control device allows for distributing said second informational data to said base apparatus corresponding to the service area in which said portable terminal apparatus is located on the basis of said positional information thus stored to transmit the data to said portable terminal apparatus.

5. The distributing system according to claim 4, wherein said portable terminal apparatus transmits a message with said inherent terminal identification information;

wherein said central processing station includes storage device for storing said message; and wherein said central control device allows for distributing to the base apparatus specified based on said positional information from another portable terminal apparatus to which said message, stored in said storage device, is transmitted.

6. The distributing system according to claim 1, wherein said central processing station includes terminal information storage device for storing said piece of identification data on said portable terminal apparatus;

wherein said portable terminal apparatus transmits said individual identification information and inherent terminal identification information; and wherein when said portable terminal apparatus acquires said second informational data in communication with one of said base apparatuses or said portable terminal apparatus transmits a request for said second informational data, said user is charged based on said piece of identification data specified by comparing said terminal identification information of said portable terminal apparatus to said piece of identification data stored in said terminal information storage device.

7. The distributing system according to claim 1, wherein said portable terminal apparatus includes input capture device for capturing a piece of processed data of a character and/or image, said portable terminal apparatus transmitting said piece of processed data and said individual identification information to said base apparatus corresponding to the service area in which said portable apparatus is located;

wherein said central processing station includes storage device for storing said piece of processed data obtained from each of said base apparatuses through said communication line; and wherein said central control device allows for processing said piece of processed data stored in said storage device, and for distributing said piece of processed data to said base apparatus corresponding to the service area in which said portable apparatus is located through said communication line to transmit the piece of processed data to said portable terminal apparatus.

8. The distributing system according to claim 1 further comprising a plurality of terminal apparatuses, wherein said central processing station includes storage device for storing profile information regarding to a level of information disclosure for a registered individual;

wherein said distributive information storage device stores announcement information relative to said profile information and to said second informational data to be distributed;

wherein each of said portable terminal apparatuses further has transmission processing device for disclosing the profile information for the individual according to said instructed level of information disclosure of the individual, and performs wireless communication with said base apparatus corresponding to the service area in which each of said terminal apparatuses is located, said wireless communication including reception of any one of said second informational data, said announcement information and said profile information; and wherein when any one of said specified pieces of individual identification data matches said individual identification information, said central processing station transmits to said base apparatuses said profile information to distribute the information to everyone of the portable terminal apparatuses except the one carried by a specified individual using said central control device.

9. The distributing system according to claim 8, wherein said announcement information is used during an introduction mode for distributing said profile information that is distributed after an introduction announcement except said introduction announcement is not used during an automatic mode for distributing said profile information.

10. The distributing system according to claim 8, wherein said transmission processing device includes a liquid crystal display unit implemented in said portable terminal apparatus, said liquid crystal display unit displaying a set menu, and said level of information disclosure is specified based on said set menu; and wherein information indicating said level of information disclosure is transmitted with said announcement information.

11. The distributing system according to claim 8, wherein said central processing station includes information processing device for listing profile information of all participants, extracting a frequently occurring common item, retrieving and collecting material related to said common item from said extracted common item, and transmitting an outline to said base apparatuses for distributing said outline information to everyone of the portable terminal apparatuses.

12. The distributing system according to claim 8, wherein, said central processing station, said material related to the central processing station is specified based on return from one of said plurality of portable terminal apparatuses after distributing said outline to said portable terminal apparatuses, with information about said material related being distributed to every of the portable terminal apparatuses through said base apparatuses.

13. A distributing method for wirelessly transmitting a second informational data to be distributed to portable terminal apparatus separately from a plurality of base apparatuses each having an image display device and a predetermined wireless service area and connected through a communication line to a central processing station having distributive information storage device for storing said second informational data and a first informational data, comprising the steps of:

acquiring individual identification information of a user using individual identification information acquiring device implemented in said portable terminal apparatus and wirelessly transmitting from the portable terminal apparatus to said base apparatus corresponding to the service area in which said portable terminal apparatus is located said acquired individual identification information;

receiving at said base apparatus corresponding to the service area in which said portable terminal apparatus is located said individual identification information transmitted from said portable terminal apparatus and transmitting said individual identification information from said base apparatus corresponding to the service area in which said portable terminal apparatus is located to said central processing station through said communication line;

comparing, at said central processing station, said individual identification information transmitted, from said corresponding base apparatus, to pieces of individual identification data stored in individual identification data storage device implemented in said central processing station;

allowing said second informational data stored in said distributive information storage device to be distributed through said communication line to said base apparatuses when any one of said specified pieces of individual identification data matching said individual identification information, said second informational data corresponds to the first informational data being displayed on said image display device, and said second informational data is different from the first informational data being displayed on said image display device; and transmitting said second informational data to said portable terminal apparatus from said base apparatus receiving said second informational data distributed through said communication line, wherein said central processing station includes information processing device for listing profile information of all participating portable terminal apparatuses of a meeting place, extracting a plurality of frequently occurring common items, weighting the common items, retrieving and collecting material related to the weighted common items, and transmitting a summary of the collected material to said base apparatuses for distributing said summary to everyone of the participating portable terminal apparatuses and for displaying the summary on said image display device.

14. The distributing method according to claim 13, further comprising the steps of:

performing transmission processing for disclosing profile information according to a level of information disclosure specified by said portable terminal apparatus when any one of said specified pieces of individual identification data matches said individual identification information is specified;

distributing said profile information according to the level of information disclosure from profile information storage device implemented in said base apparatus when receiving an indication of said level of information disclosure or said second informational data stored in said distributive information storage device, to said base apparatuses through said communication line;

transmitting to a plurality of portable terminal apparatuses said second informational data from said base apparatus distributed through said communication line or transmitting said profile information to everyone of said portable terminal apparatuses located within the service area of the corresponding base apparatus except said portable terminal apparatus having transmitted said piece of individual identification data.

15. The distributing method according to claim 14, wherein said transmission processing includes a step of adding announcement information relative to said profile information; and wherein said announcement information is used during an introduction mode for distributing said profile information that is distributed after an introduction announcement aside from an automatic mode for distributing said profile information without an introduction announcement.

16. The distributing method according to claim 14, wherein a processing step of the central processing station includes the steps of specifying said material related to said profile information based on return from one of said plurality of portable terminal apparatuses after distributing the outline to said portable terminal apparatuses through said base apparatus, and distributing information about said related information to everyone of the portable terminal apparatuses through said base apparatus.

17. The distributing method of claim 13, wherein each of the base apparatuses includes a distributive information storage device for storing said second informational data to be distributed that is related to each of the displayed first informational data on said image display device, each of said base apparatuses performing wireless communication including transmission of said second informational data; and wherein when any one of a plurality of first informational data is being displayed on said image display device, said base apparatus transmits to said portable terminal apparatus located within the service area corresponding to said transmitting base apparatus said second informational data stored in said distributive information storage device, said second informational data corresponding to said first informational data.

18. The distributing method according to claim 17, wherein each of said base apparatuses includes individual identification data storage device for storing pieces of individual identification data;

wherein each of said base apparatuses compares said individual identification information transmitted from said portable terminal apparatus located with the service area corresponding to said base apparatus to said pieces of individual identification data stored in said individual identification data storage device; and wherein when any one of said specified pieces of individual identification data matches said individual identification information, said base apparatus transmits to said portable terminal apparatus said second informational data that is related to said first informational data displayed on said image display device.

19. The distributing method according to claim 17, wherein said second informational data contains a piece of additional data adding identification information that is related to said information; and wherein said displayed first informational data and said second informational data are correlated with each other by said piece of additional data.

20. The distributing system according to claim 17, wherein said individual identification data storage device stores a plurality of pieces of said individual identification data each corresponding to every individual identification code that are assigned to said individual;

wherein each of said base apparatuses compares said individual identification information transmitted from said portable terminal apparatus located within the service area corresponding to the base apparatus to said pieces of individual identification data stored in said individual identification data storage device; and wherein when any one of said pieces of individual identification data matching said individual identification information is selected to specify said individual identification code, said base apparatus transmits said information to said portable terminal apparatus located within the service area corresponding to the base apparatus.

21. The distributing system according to claim 20, wherein when said portable terminal apparatus acquires specific information in communication with said base apparatus or said portable terminal apparatus transmits the specific information, a user of said portable terminal apparatus is charged based on an individual identification code of said user.

22. The distributing system according to claim 17, wherein said portable terminal apparatus transmits inherent terminal identification information and said individual identification information;
wherein each of said base apparatuses includes terminal information storage device for storing said piece of identification data of said portable terminal apparatus; and
wherein when said portable terminal apparatus acquires specific information in communication with said base apparatus or said portable terminal apparatus transmits the specific information, a user is charged based on the terminal identification information of said portable terminal apparatus.

23. The distributing method according to claim 17, wherein each of said base apparatuses has storage device for storing profile information that is related to a level of information disclosure for a registered individual, and said distributive information storage device stores announcement information relative to said profile information in addition to said second informational data to be distributed;
wherein said portable terminal apparatus includes transmission processing device for disclosing said profile information of the individual according to the instructed level of information disclosure; and
wherein when a piece of individual identification data from said portable terminal apparatus is specified, said profile information received, from said portable terminal apparatus according to the level of information disclosure, is transmitted to portable terminal apparatuses located within the service area corresponding to said base apparatus except said portable terminal apparatus having transmitted said piece of individual identification data, and to said image display device.

24. The distributing method according to claim 23, wherein said announcement information is used during an introduction mode for distributing said profile information after distributing an introduction announcement aside from an automatic mode for distributing said profile information without an introduction announcement.

25. The distributing method according to claim 23, wherein said transmission processing device includes a liquid crystal display unit implemented in said portable terminal apparatus, said liquid crystal display unit displaying a set menu, and said level of information disclosure is specified based on said set menu; and
wherein information indicating said level of information disclosure is transmitted with said announcement information.

26. The distributing method according to claim 23, wherein said displayed material related to said profiled information is specified based on return from one of said a plurality portable terminal apparatuses after distributing said outline to said portable terminal apparatuses, with information related to said profile information being distributed to each of said terminal apparatuses or to said image display device said outline being obtained by listing profile information of all participants, extracting a frequently occurring common item, retrieving and collecting material related to said extracted common item.

27. The distributing method of claim 13, wherein each of the base apparatuses includes an image display and distributive information storage device for storing said second informational data to be distributed in relation to each piece of first informational data displayed on said image display device, the method further comprising the steps of:
displaying any one of said first informational data on said image display device;
receiving at said base apparatus said individual identification information, transmitted from said portable terminal apparatus located within the service area corresponding to the base apparatus, to compare said individual identification information to pieces of individual identification data stored in individual identification data storage device implemented in said base apparatus; and
allowing said second informational data corresponding to said first informational data displayed on said image display device, said second informational data being stored in said distributive information storage device, to be transmitted to said portable terminal apparatus when any one of said specified pieces of individual identification data matches said individual identification information.

28. The distributing method according to claim 27, wherein a step of performing transmission processing for disclosing profile information according to instructed level of information disclosure specified in said portable terminal apparatus is added as a step to be performed in said portable terminal apparatus when any one of said specified pieces of individual identification data matches said individual identification information; and
wherein a step of transmitting said profile information according to said level of information disclosure is added into said base apparatus when receiving an indication of said level of information disclosure, from profile information storage device implemented in said base apparatus to everyone of the portable terminal apparatuses located within the service area corresponding to the base apparatus except said portable terminal apparatus having transmitted said piece of individual identification data or to said image display device.

29. The distributing method according to claim 28, wherein said transmission processing includes a step of adding announcement information to said profile information; and
wherein said announcement information is used during an introduction mode for distributing said profile information after distributing said introduction announcement aside from an automatic mode for distributing said profile information without an introduction announcement.

30. The distributing method according to claim 28, wherein a processing step, at the base apparatuses, includes the steps of listing profile information of all participants, extracting a frequently occurring common item, retrieving and collecting material related to said extracted common item, and then distributing an outline to each of the portable terminal apparatuses or to said image display device.

31. The distributing method according to claim 28, wherein a processing step, at the base apparatuses, includes the steps of specifying said material related to said individual information based on return from one of said plurality of portable terminal apparatuses after distributing said outline to said portable terminal apparatuses, and distributing information related to profile information to each of said portable terminal apparatuses or to said image display device.

32. A distributing system comprising:
- a plurality of base apparatuses each having a predetermined wireless service area and an image display device and performing wireless communication including data transmission;
- a central processing station including distributive information storage device for storing a first informational data and a second informational data to be distributed, the informational data corresponds to material displayed on said image display device, and the second informational data is different from the first informational data displayed on said image display device, said central processing station being connected with each of said base apparatuses through a communication line to distribute said information to each of said base apparatuses; and
- a portable terminal apparatus for performing wireless communication with said base apparatuses, said communication including reception of said second informational data obtained from said central processing station through said communication line, wherein, when the portable terminal apparatus is located within the service area corresponding to one of the plurality of base apparatuses, the portable terminal apparatus is operable to perform wireless communication with the corresponding base apparatus, wherein when any one of said materials is being displayed on said image display device, said base apparatus transmits said second informational data stored in said material information storage device, said informational data corresponding to said first informational data,
- wherein said central processing station includes information processing device for listing profile information of all participating portable terminal apparatuses of a meeting place, extracting a plurality of frequently occurring common items, weighting the common items, retrieving and collecting material related to the weighted common items, and transmitting a summary of the collected material to said base apparatuses for distributing said summary to everyone of the participating portable terminal apparatuses and for displaying the summary on said image display device.

33. The distributing system according to claim 32 further comprising a plurality of portable terminal apparatuses, wherein each of said portable terminal apparatuses includes individual identification information acquiring device for acquiring individual identification information from a user and device for transmitting said individual identification information acquired by said individual identification information acquiring device to said base apparatus;
- wherein said central processing station includes individual identification data storage device for storing pieces of individual identification data;
- wherein said central processing station comprises central control device for allowing said individual identification information, transmitted from said portable terminal apparatus to said base apparatus and distributed through said communication line, to be compared to said pieces of individual identification data stored in said individual identification data storage device; and
- wherein said central control device allows said information to be distributed to said base apparatuses to transmit the information to said portable terminal apparatus when any one of said specified pieces of individual identification data matches said individual identification information.

34. The distributing system according to claim 32, wherein said second informational data contains a piece of additional data adding identification information related to said second informational data; and
- said first informational data and said second informational data are correlated with each other by said piece of addition data.

35. The distributing system according to claim 33, wherein said individual identification data storage device stores a plurality of pieces of said individual identification data each corresponding to an individual identification code that relates to said individual;
- wherein said central control device allows for comparing said individual identification information transmitted from said portable terminal apparatus to said base apparatuses and distributed through said communication line to said pieces of individual identification data stored in said individual identification data storage device; and
- wherein when any one of said pieces of individual identification data matching said individual identification information is selected to specify said individual identification code, said central control device allows for distributing said second informational data to said base apparatus to transmit the piece of informational data to said portable terminal apparatus.

36. The distributing system according to claim 33, wherein when said portable terminal apparatus acquires said second informational data in communication with one of said base apparatuses or said portable terminal apparatus transmits a request for said second informational data, a user of said portable terminal apparatus is charged based on an individual identification code of said user.

37. The distributing system according to claim 33, wherein said central processing station further comprises terminal information storage device for storing a piece of identification data for said portable terminal apparatus;
- wherein said portable terminal apparatuses transmits to said base apparatus inherent terminal identification information and said individual identification information;
- wherein said central processing station receives said inherent terminal identification information with positional information on said base apparatus corresponding to the service area in which said portable terminal apparatus is located, and said terminal information storage device stores the inherent terminal identification information and the positional information; and
- wherein said central control device allows for distributing said second informational data to said base apparatuses based on said stored positional information to transmit the second informational data to said portable terminal apparatus.

38. The distributing system according to claim 37, wherein said potable terminal apparatus transmits a message and said inherent terminal identification information;
- wherein said central processing station includes storage device for storing said message; and
- wherein said central control device allows for distributing to said base apparatuses specified based on said positional information from another portable terminal apparatus to which said message, stored in said storage device, is transmitted.

39. The distributing system according to claim 33, wherein said central processing station further comprises terminal information storage device for storing a piece of identification data for said portable terminal apparatus;

wherein said portable terminal apparatus transmits said individual identification information and inherent terminal identification information; and wherein when said portable terminal apparatus acquires said second informational data in communication with one of said base apparatuses or said portable terminal apparatus transmits a request for said second informational data, a user is charged based on said piece of identification data specified by comparing said terminal identification information of said portable terminal apparatus to said piece of identification data stored in said terminal information storage device.

40. The distributing system according to claim 33, wherein said portable terminal apparatus includes input capture device for capturing a piece of processed data of character and/or image, said portable terminal apparatus transmitting said piece of processed data and said individual identification information to said base apparatus;

wherein said central processing station includes storage device for storing said piece of processed data obtained from said base apparatus through said communication line; and wherein said central control device allows for processing said piece of processed data stored in said storage device to a piece of processed data, and for distributing said piece of process data to said base apparatus through said communication line to transmit the piece of process data to said portable terminal apparatus.

41. The distributing system according to claim 32, wherein said central processing station includes storage device for storing profile information related to a level of information disclosure for a registered individual;

wherein said distributive information storage device stores announcement information relative to said profile information and said second informational data to be distributed;

wherein said portable terminal apparatus includes transmission processing device for disclosing the profile information for the individual according to the instructed level of information disclosure of the individual; and wherein when said piece of individual identification data from said portable terminal apparatus is specified, said central processing station transmits to said base apparatuses said profile information received in accordance with the level of information disclosure from said portable terminal apparatus to distribute said profile information to portable terminal apparatuses located within the service areas corresponding to respective said base apparatuses except said portable terminal apparatus having transmitted said piece of individual identification data, or to said image display device.

42. The distributing system according to claim 41, wherein said announcement information is used during an introduction mode for distributing said profile information after distributing an introduction announcement aside from an automatic mode for distributing said profile information without an introduction announcement.

43. The distributing system according to claim 41, wherein said transmission processing device includes a liquid crystal display unit implemented in apparatus, said liquid crystal display unit displaying a set menu, and said level of information disclosure is specified based on said set menu; and wherein information indicating said level of information disclosure is transmitted with said announcement information.

44. The distributing system according to claim 41, wherein said central processing station specifies said material related to profile information based on return from one of said plurality of portable terminal apparatuses after distributing said outline to said portable terminal apparatuses, and distributing said information to each of said portable terminal apparatuses through said base apparatus or to said image display device.

45. A distributing method using a plurality of base apparatuses each having a predetermined service area and an image display device and a central processing station having distributive information storage device for storing a second informational data to be distributed that is related to a first informational data displayed on said image display device, for wirelessly transmitting said second informational data to portable terminal apparatus separately from said base apparatuses each connected through a communication line to said central processing station, comprising the steps of:

displaying the first informational data on said image display device;

acquiring individual identification information from a user using individual identification information acquiring device implemented in the portable terminal apparatus, and wirelessly transmitting from the portable terminal apparatus to said base apparatus corresponding to the service area in which said portable terminal apparatus is located said acquired individual identification information;

receiving at said base apparatus corresponding to the service area in which said portable terminal apparatus is located said individual identification information transmitted from said portable terminal apparatus and transmitting said individual identification information to said central processing station through said communication line;

comparing, at said processing station, said individual identification information transmitted from said base apparatus to pieces of individual identification data stored in individual identification data storage device implemented in said central processing station;

distributing said second informational data, stored in said distributive information storage device, to said base apparatuses through said communication line when any one of said specified pieces of individual identification data matching said individual identification information; and transmitting said second informational data from said base apparatus, transmitted through said communication line, to said portable terminal apparatus, said second informational data is corresponds to said material displayed on said image display device, and said second informational data is different from the material displayed on said image display device, wherein said central processing station includes information processing device for listing profile information of all participating portable terminal apparatuses of a meeting place, extracting a plurality of frequently occurring common items, weighting the common items, retrieving and collecting material related to the weighted common items, and transmitting a summary of the collected material to said base apparatuses for distributing said summary to everyone of the participating portable terminal apparatuses and for displaying the summary on said image display device.

46. The distributing method according to claim 45, wherein a processing step at the central processing station, includes a step of performing transmission processing for disclosing said profile information according to said instructed level of information disclosure when any one of said specified pieces of individual identification data matches said individual identification information is added as a processing step for said portable terminal apparatus; and wherein, a step of transmitting said profile information to said base apparatuses according to said level of information disclosure, when receiving an indication of said level of information disclosure from profile information storage device, implemented in said central processing station to distribute said profile information to everyone of a plurality of portable terminal apparatuses located within the service areas corresponding to said respective base apparatuses except said portable terminal apparatus having transmitted said piece of individual identification data or to said image display device.

47. The distributing method according to claim 46, wherein said transmission processing includes a step of adding announcement information relative to said profile information; and wherein said announcement information is used during an introduction mode for distributing said profile information after distributing an introduction announcement aside from an automatic mode for distributing said profile information without an introduction announcement.

48. The distributing system according to claim 46, wherein a processing step at said base apparatuses includes the steps of specifying said profile information based on return from representative one of said plurality of portable terminal apparatuses after distributing said outline to said portable terminal apparatuses, and distributing information about said material related to profile information to each of said portable terminal apparatuses or to said image display device.

* * * * *